(12) United States Patent
Dickey et al.

(10) Patent No.: US 7,331,037 B2
(45) Date of Patent: Feb. 12, 2008

(54) STATIC MEMORY ALLOCATION IN A GRAPHICAL PROGRAMMING SYSTEM

(75) Inventors: Roger F. Dickey, Richardson, TX (US); Petr Pomkla, Austin, TX (US); Andrew P. Dove, Austin, TX (US)

(73) Assignee: National Instruments Corporation, Austin, TX (US)

( * ) Notice: Subject to any disclaimer, the term of this patent is extended or adjusted under 35 U.S.C. 154(b) by 532 days.

(21) Appl. No.: 10/981,816

(22) Filed: Nov. 5, 2004

(65) Prior Publication Data

US 2006/0036798 A1 Feb. 16, 2006

Related U.S. Application Data

(60) Provisional application No. 60/601,067, filed on Aug. 12, 2004.

(51) Int. Cl.
*G06F 9/44* (2006.01)

(52) U.S. Cl. ............... 717/106; 717/109; 717/110; 717/113

(58) Field of Classification Search ............ 717/106, 717/109, 110, 113; 711/170
See application file for complete search history.

(56) References Cited

U.S. PATENT DOCUMENTS

| | | | |
|---|---|---|---|
| 5,247,674 A * | 9/1993 | Kogure | 711/170 |
| 6,078,745 A * | 6/2000 | De Greef et al. | 717/151 |
| 6,437,805 B1 * | 8/2002 | Sojoodi et al. | 717/105 |
| 6,738,964 B1 * | 5/2004 | Zink et al. | 717/109 |
| 7,210,117 B2 * | 4/2007 | Kudukoli et al. | 717/109 |

OTHER PUBLICATIONS

Resendez, et al. "LabVIEW Programming for Internet-Based Measurements", 2003, Consortium for Computing in Small Colleges, p. 79-85.*
Kolling, et al. "Objects First With Java and BlueJ", 2000, ACM, p. 429.*
Lee et al., "Dataflow Process Networks," Proceedings of the IEEE, vol. 83, No. 5, May 1995, (63 pages).

* cited by examiner

*Primary Examiner*—Wei Zhen
*Assistant Examiner*—Qamrun Nahar
(74) *Attorney, Agent, or Firm*—Meyertons Hood Kivlin Kowert & Goetzel, P.C.; Jeffrey C. Hood; Mark S. Williams

(57) ABSTRACT

System and method for static memory allocation (SMA) in a graphical programming system. A graphical program (GP) may be created in response to user input, comprising nodes interconnected by wires for inter-node communication, which visually indicates functionality of the program, and includes a plurality of data elements. The GP is programmatically analyzed to determine: memory requirements for each of the data elements, and one or more subsets of the data elements that can share a memory block, e.g., by traversing the GP to determine one or more static paths, each comprising a path of wire along which a single statically allocated memory block can be used. One or more SMAs are programmatically included in the GP in response, executable to statically allocate a shared memory block for each subset. The GP may be executed, including executing the SMAs to statically allocate the shared memory blocks for each of the subsets.

20 Claims, 17 Drawing Sheets

STATIC MEMORY ALLOCATION IN A GRAPHICAL PROGRAMMING SYSTEM

PRIORITY DATA

The application claims benefit of priority of U.S. Provisional Application Ser. No. 60/601,067, titled "Static Memory Allocation In A Graphical Programming System", filed Aug. 12, 2004, and whose inventors were Roger F. Dickey, Petr Pomkla, and Andrew P. Dove.

BACKGROUND OF THE INVENTION

1. Field of the Invention

The present invention relates to the field of graphical programming, and more particularly to a system and method for static memory allocation (SMA) in a graphical programming system.

2. Description of the Related Art

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, motion control, and embedded applications, among others.

Many applications require, or may benefit from, reliable performance with respect to execution timing. In other words, it may be important or beneficial for functions or events to be performed by a program with strict timing constraints. For example, an industrial measurement and control program may be required to take measurements at precise intervals of one millisecond, and send control signals, e.g., to an actuator, every five milliseconds. Systems with such timing requirements may be referred to as "real time" systems, and may be based on embedded processor technologies, workstations or personal computers, programmable hardware elements, such as field programmable gate arrays (FPGAs), or any other computational hardware.

However, programs that rely on dynamic memory allocation and deallocation may have difficulty meeting such timing requirements due to variability in performance caused by memory management overhead. This variability in performance may be referred to as "jitter". For example, depending on factors such as memory management algorithms, the state of the heap, e.g., level of fragmentation, and so forth, the time spent performing an allocation or deallocation may vary substantially, and may thus impact the timing of other functions performed by the program.

One approach for mitigating or eliminating this problem is to use static memory allocation, where all memory required by the application program is allocated at runtime prior to executing the program instructions, as opposed to dynamic memory allocation and deallocation, performed while the program is executing.

However, some prior art graphical programming systems do not support exclusive static memory allocation (i.e., no dynamic memory management), and those that do have shortcomings that may substantially limit the benefits of such an approach. For example, prior art approaches that support exclusive static memory allocation typically result in programs with very large memory footprints, due to the fact that memory allocated statically for data structures is reserved for the execution life of the program, even if some of the data structures are only used or needed for some of the time. For example, if a five megabyte array is used during an initialization procedure of the program, but not used thereafter, that five megabytes is still reserved for the duration of the program execution, and so remains unused for most of the time. Such inefficiencies may limit the applicability of this approach in many application domains, such as, for example, in embedded systems that have extremely limited memory resources.

SUMMARY OF THE INVENTION

One embodiment of the present invention comprises a system and method for creating or configuring a graphical program to utilize static memory allocation.

A graphical program may first be created on a computer system or stored in a memory. The graphical program may be created or assembled by the user arranging on a display a plurality of nodes or icons and then interconnecting the nodes to create the graphical program. The nodes may be interconnected in one or more of a data flow, control flow, or execution flow format. The graphical program may thus comprise a plurality of interconnected nodes or icons which visually indicates the functionality of the program. The graphical program also preferably includes a plurality of data elements, e.g., data structures, such as arrays, clusters, objects (e.g., instantiated from classes), and so forth. Where the graphical program includes a user interface portion, the user may optionally assemble the user interface on the display. In response to the user assembling the graphical program, code and/or data structures may be created and stored which represent the graphical program.

A software program may then execute to programmatically analyze the graphical program. In one embodiment, the analysis may include determining memory requirements for each of the plurality of data elements, and determining one or more subsets of the plurality of data elements that can share a memory block. In other words, the memory requirements of the data elements may be analyzed in the context of the program execution order to determine if and when the same memory can be used for multiple data elements. For example, a ten element array of integers used during an initialization procedure of the program and a similarly sized array of integers used during a clean up procedure of the program may be able to use the same memory, since they would not overlap in their use during program execution.

In one embodiment, in determining the memory requirements of the data elements, i.e., in determining what memory needs to be allocated, each array and string signal may be set as fixed-size or bounded and its fixed-size or maximum size bound determined. This may be performed during type propagation and may occur when the graphical program (or "VI") is loaded into memory and during editing.

In various embodiments, determining one or more subsets of the plurality of data elements that can share a memory block may include traversing the nodes in the graphical program to determine one or more static paths, where each static path comprises a path of wire along which a single statically allocated block of memory can be used. In other words, each static path may comprise one or more sequential (but not necessarily contiguous) wire segments with graphical program nodes where a statically allocated block of memory can be used (and re-used) for data elements that might otherwise be dynamically allocated separate memory blocks.

For example, the following exemplary classes of functions may be grouped and characterized according to memory requirements.

1. Functions generating data with known size
   a) These functions output string or array data with a size that can be determined exactly at compile time based on the inputs they take;
   b) Memory can be statically allocated with constant inputs (inputs with constants wired to them, or with a default value being used) or variable inputs (inputs with non-constant sources);
2. Functions generating data with known maximum size only
   a) These functions output string or array data for which the size bound can be determined exactly at compile-time based on the inputs, but not always the actual size;
   b) Given variable inputs, these functions allocate the amount of memory specified by the size bound;
   c) Some functions can allocate less memory given constant inputs, but this is an option that may require implementation in the primitive's type propagation routine;
3. Functions with variable output size
   a) These functions output string or array data for which neither the size, nor the size bound can be guessed at compiler-time in an input-agnostic fashion;
   b) In most cases, these functions may prevent a program from only allocating static memory;
   c) Sometimes, given constant inputs, memory can be allocated statically for the output, but this is an option that may require implementation in the primitive's type propagation routine;
4. Functions that run in-place
   a) These functions operate on strings or arrays, but should not affect the compiler's pre-allocation or reuse of memory;
   b) If any of these are implemented in such a way that they allocate memory, they may need to be re-factored, i.e., re-formulated to use statically allocated memory;
5. Miscellaneous functions
   a) Functions that operate on strings or arrays;
   b) Functions have interesting properties which are explained in more detail in the "miscellaneous functions" section below.

In various embodiments, one or more of the following rules may be used in characterizing and assigning memory requirements for signals. Note that some or all of these rules may also be applied to temporary data elements used in or by function nodes, i.e., to data elements that are not passed between nodes via wires, but are still needed by the functions or nodes to perform their specified functionality.

Any signals coming from array or string constants may be set as fixed size automatically (e.g., with the fixed-size equal to the exact size of the data inside).

When a binary numeric operator has two fixed size arrays as input, it may set its output signal to be fixed-size with the size of its smallest input.

When a decimate array primitive receives a fixed-size array as input, it may assign its output signals to be fixed-size arrays with sizes equal to floor(inputSize/numOutputs).

In and out terminals on tunnels and left-shift registers may use the same fixed-size or bounded array or string, and so memory does not need to be copied. As used herein, the term "tunnel" refers to an element or mechanism to connect signals on the inside of a structure node (for, while, sequence etc) to signals on the outside of a structure node.

Build arrays may calculate the size of the fixed-size or bounded output array by summing the sizes of the inputs arrays.

A "delete from array" primitive may only guess the exact size of its output if constants are wired to its width and index input; otherwise, it may set its output signal to be a bounded array with a maximum size equal to the size of the fixed-size or bounded input array.

In one embodiment, prior to, or as part of, the analysis, target syntax checking may be performed on the graphical program to determine whether or not memory can be allocated statically for all signals, e.g., for all data elements used in the program. In other words, analyzing the graphical program also include: prior to said determining memory requirements, determining if any of the data elements require dynamic memory allocation, and if the analyzing determines that dynamic memory is required, indicating an error.

For example, if the analysis determines that the program requires dynamic allocation of memory, errors may be indicated at edit time via target syntax checking in the form of broken wires. In one embodiment, the assignment of array and string signals as fixed-size, bounded, or variable may be done at edit time by type propagation, and if any signals have to be assigned as variable, the target syntax checking process may indicate the error, e.g., by presenting a text description of the error, breaking a "run arrow", or otherwise indicating the error in the graphical program.

During or after the analysis described above, one or more static memory allocations may be programmatically included in the graphical program in response to the analysis above, where the one or more static memory allocations may be executable to statically allocate shared memory blocks for each of the one or more subsets of data elements. In other words, any dynamic memory allocations in the program may be replaced with static memory allocations. Note that these replacements may not be "one to one" with respect to the dynamic allocations, since where possible, one static memory allocation, i.e., one statically allocated memory block, may be used in place of several dynamic memory allocations.

Thus, each of the subsets of data elements determined above may be assigned a respective static memory allocation, or, said another way, a static memory allocation for each subset may be determined, and code (graphical and/or text-based code) generated specifying the allocations.

The graphical program may then be executed with the static memory allocations.

BRIEF DESCRIPTION OF THE DRAWINGS

A better understanding of the present invention can be obtained when the following detailed description of the preferred embodiment is considered in conjunction with the following drawings, in which.

Figure 1A:
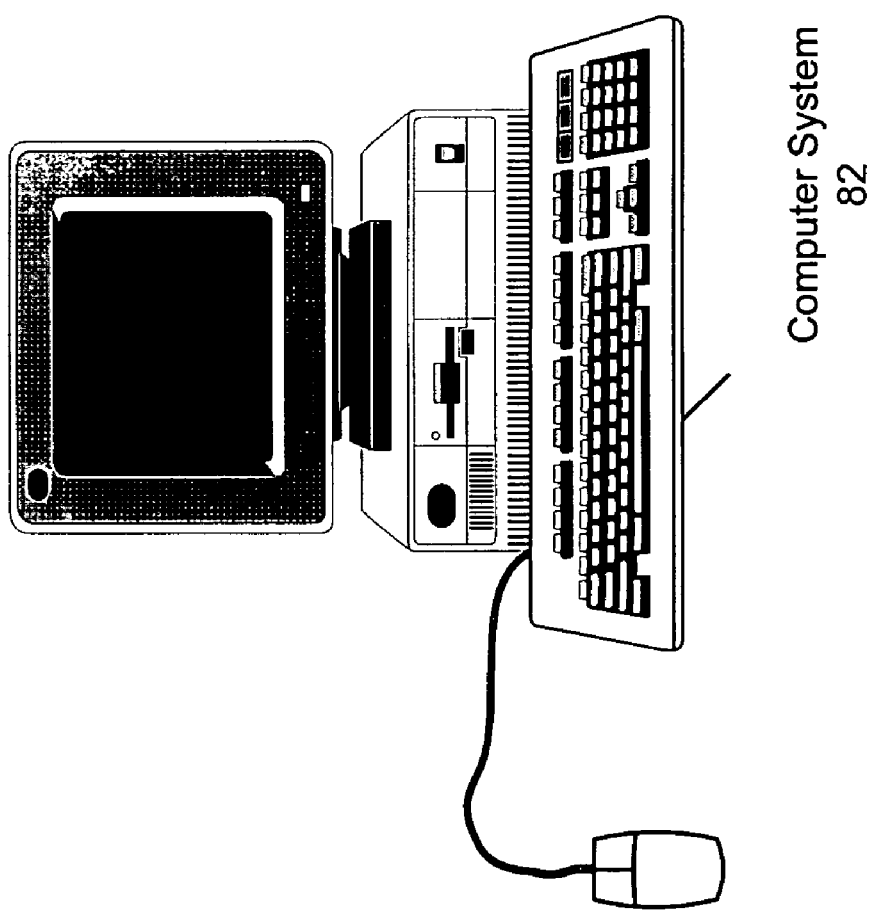
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Provisional Application Ser. No. 60/601,067, titled "Static Memory Allocation In A Graphical Programming System", filed Aug. 12, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to implement various embodiments of the present invention. One embodiment of a method for creating a graphical program operable to utilize static memory allocation is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system.

Various embodiments further include receiving or storing instructions and/or data implemented in accordance with the foregoing description upon a carrier medium.

Figure 1B:
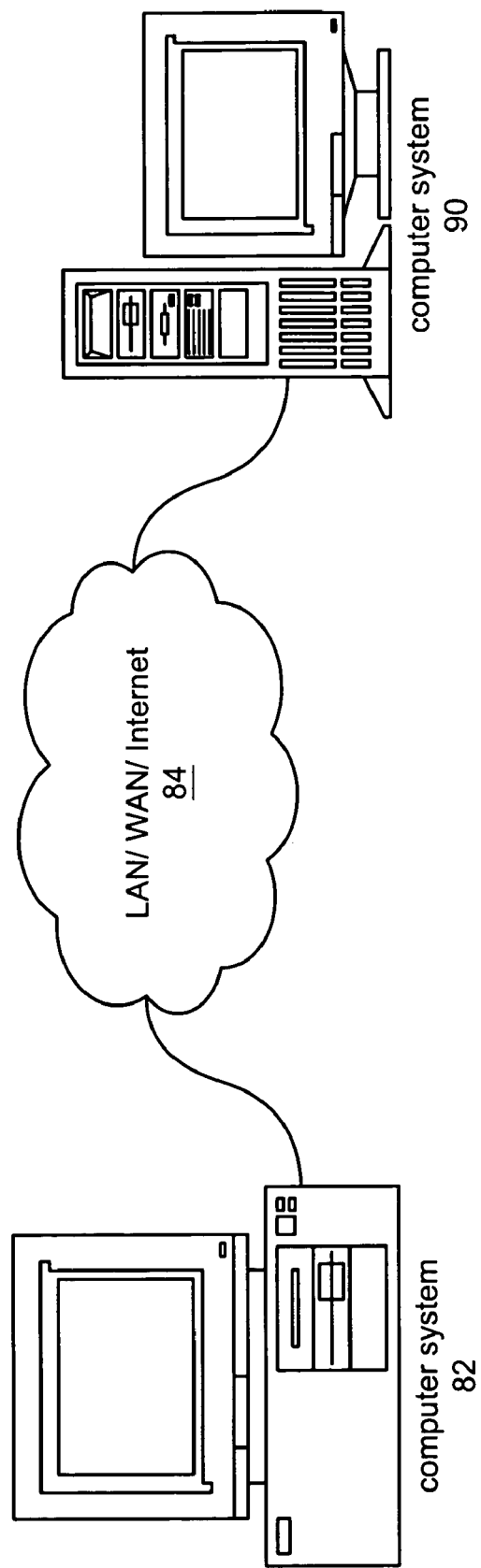
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
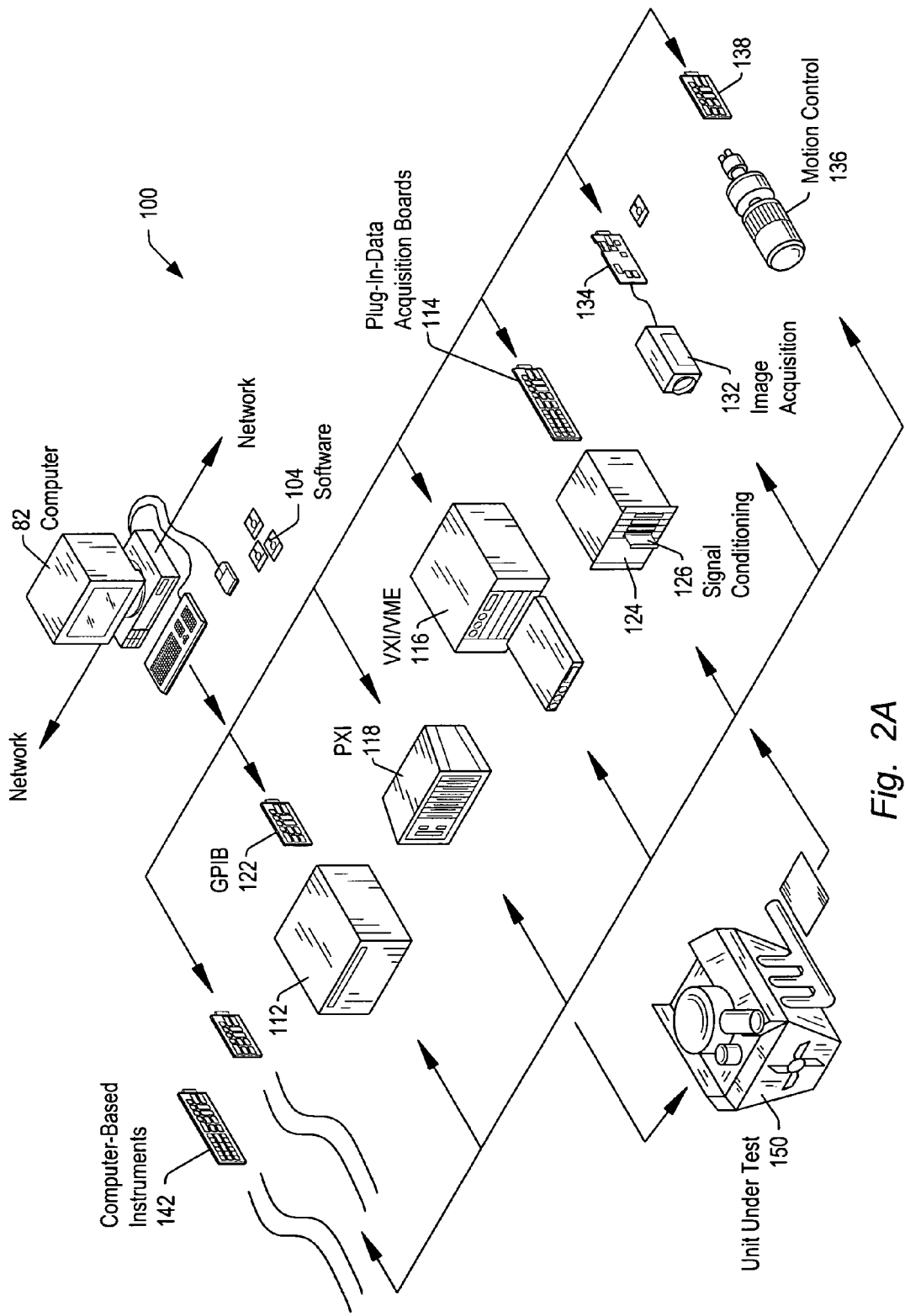
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
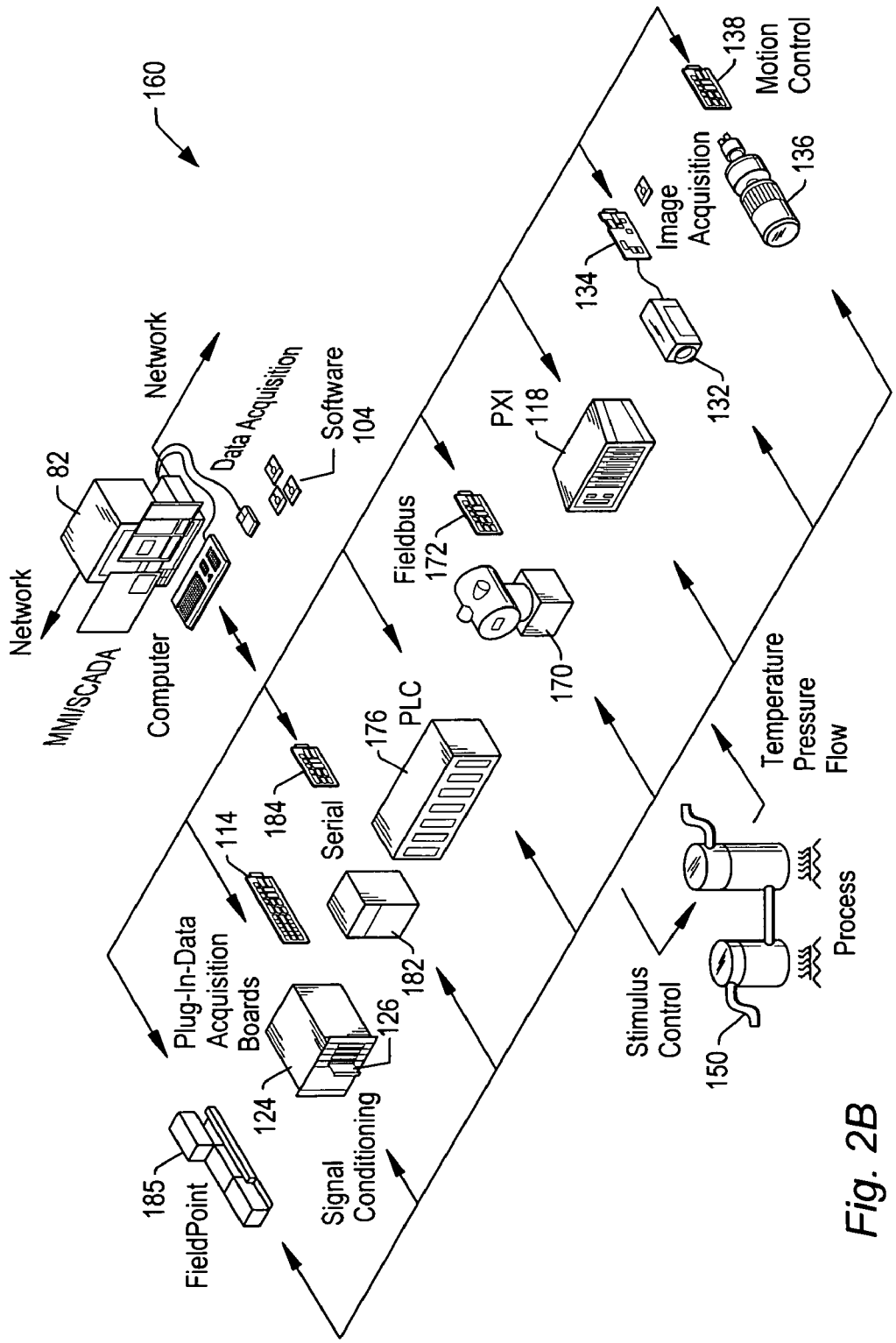
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADAD (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
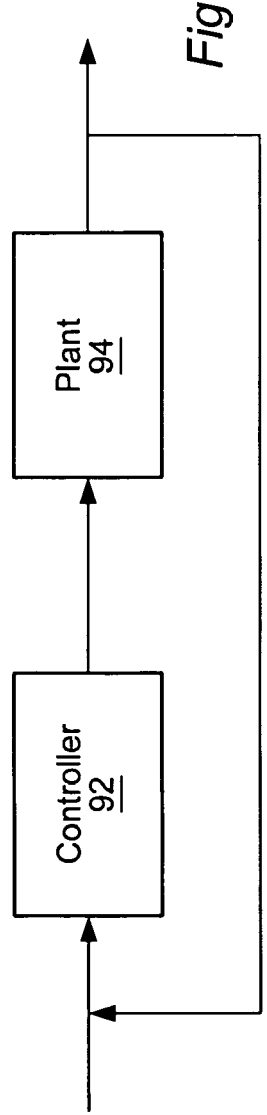
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
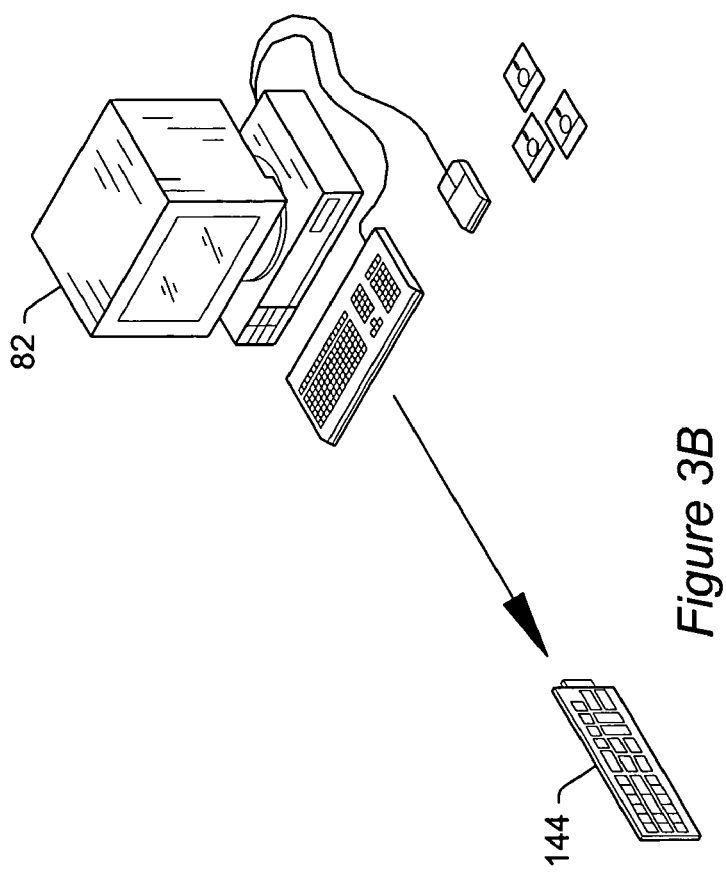
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
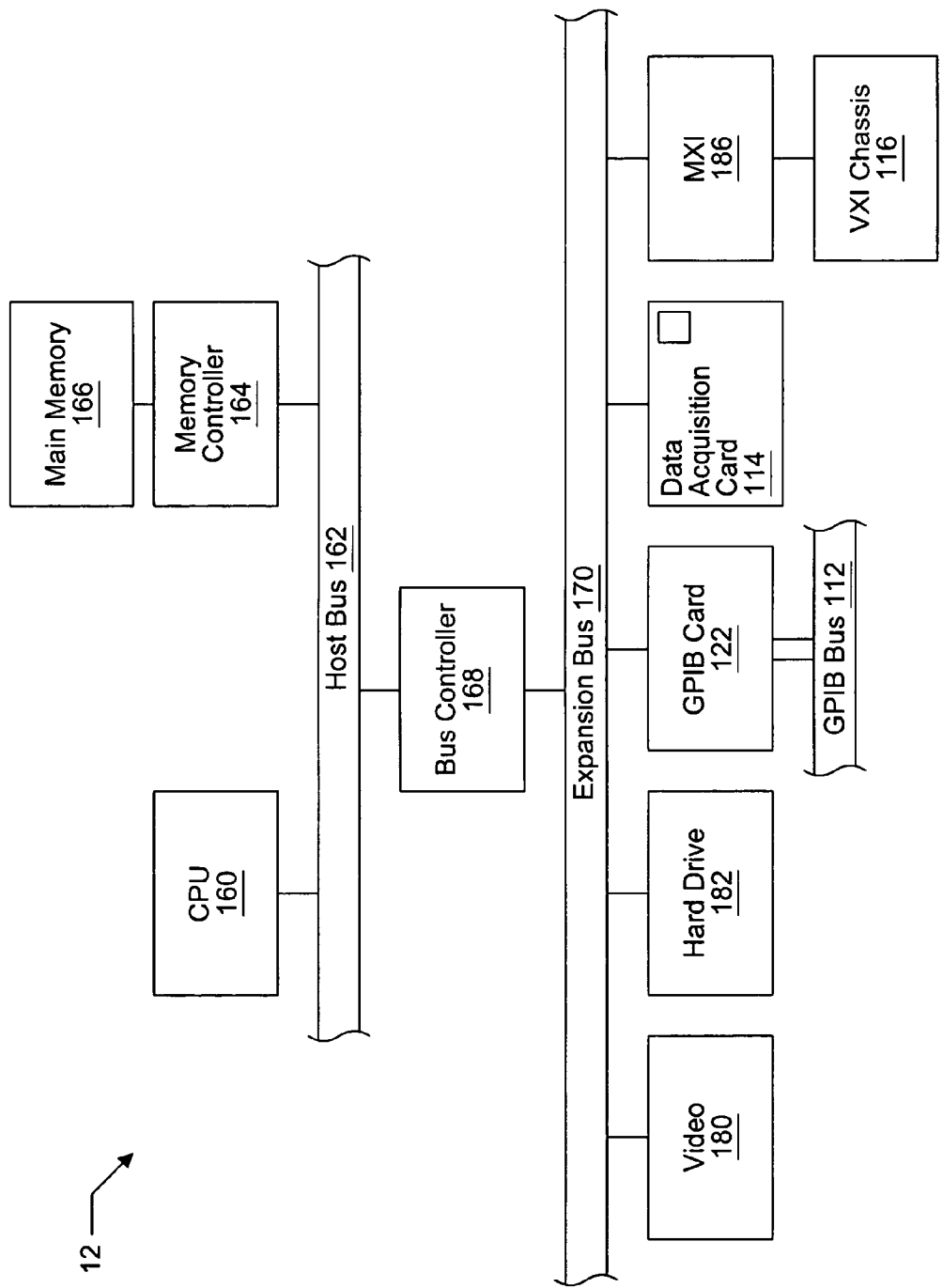
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to utilize static memory allocation. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
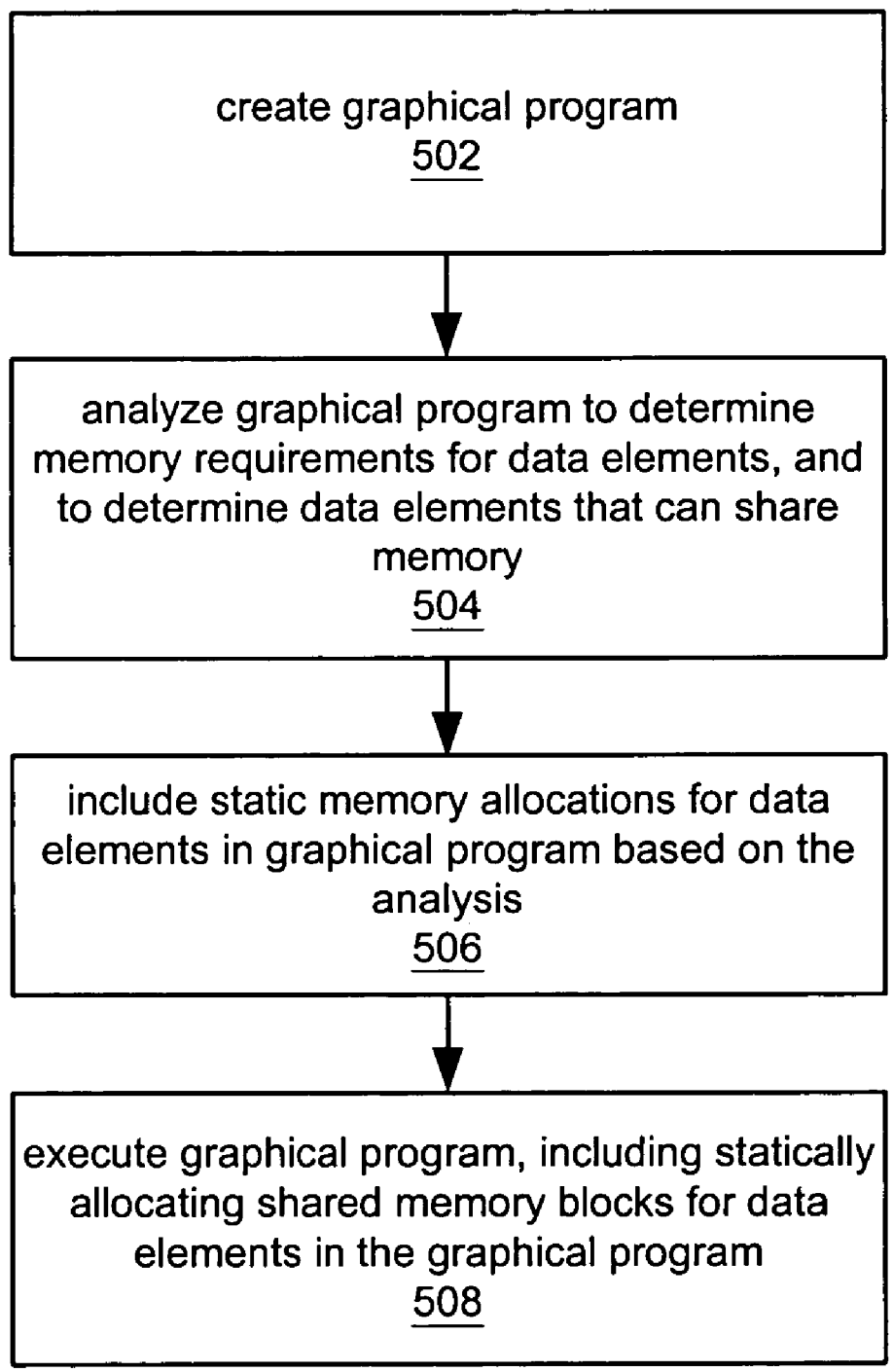
FIG. 5 is a flowchart diagram illustrating one embodiment of a method for static memory allocation in a graphical programming system.

FIG. 5—Method for Static Memory Allocation in a Graphical Programming System

FIG. 5 illustrates a method for creating a graphical program utilizing static memory allocation, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, as FIG. 5 shows, in 502 a graphical program may be created on the computer system 82 (or on a different computer system). The graphical program may be created or assembled by the user arranging on a display a plurality of nodes or icons and then interconnecting the nodes to create the graphical program. Further details regarding creation of a graphical program are provided below.

In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. The graphical program also preferably includes a plurality of data elements, e.g., data structures, such as arrays, clusters, objects (e.g., instantiated from classes), and so forth. Note that as used herein, the term "signal" may refer to any data element transferred or otherwise communicated between graphical program elements or nodes, e.g., as indicated by wires connecting the nodes.

As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In 504, the graphical program may be programmatically analyzed. In one embodiment, the analysis may include determining memory requirements for each of the plurality of data elements, and determining one or more subsets of the plurality of data elements that can share a memory block. In other words, the memory requirements of the data elements may be analyzed in the context of the program execution order to determine if and when the same memory can be used for multiple data elements. For example, a ten element array of integers used during an initialization procedure of the program and a similarly sized array of integers used during a clean up procedure of the program may be able to use the same memory, since they would not overlap in their use during program execution.

In one embodiment, in determining the memory requirements of the data elements, i.e., in determining what memory needs to be allocated, each array and string signal may be set as fixed-size or bounded and its fixed-size or maximum size bound determined. This may be performed during type propagation and may occur when the VI is loaded into memory and during editing.

In preferred embodiments, the graphical program's plurality of interconnected nodes may be interconnected by wires operable to communicate data between the nodes. Determining one or more subsets of the plurality of data elements that can share a memory block may include traversing the graphical program to determine one or more static paths, where each static path comprises a path of wire along which a single statically allocated block of memory can be used. In other words, each static path may comprise one or more sequential (but not necessarily contiguous) wire segments with graphical program nodes where a statically allocated block of memory can be used (and re-used) for data elements that might otherwise be dynamically allocated separate memory blocks.

For example, the following classes of functions are grouped and characterized according to memory requirements. Note that these functions are examples of LabVIEW functions, and are intended to be exemplary only, and that any other set of graphical program functions may also be similarly characterized.

1. Functions generating data with known size
    a) These functions output string or array data with a size that can be determined exactly at compile time based on the inputs they take;
    b) Memory can be statically allocated with constant inputs (inputs with constants wired to them, or with a default value being used) or variable inputs (inputs with non-constant sources);

2. Functions generating data with known maximum size only
    a) These functions output string or array data for which the size bound can be determined exactly at compile-time based on the inputs, but not always the actual size;
    b) Given variable inputs, these functions allocate the amount of memory specified by the size bound;
    c) Some functions can allocate less memory given constant inputs, but this is an option that may require implementation in the primitive's type propagation routine;
3. Functions with variable output size
    a) These functions output string or array data for which neither the size, nor the size bound can be guessed at compiler-time in an input-agnostic fashion;
    b) In most cases, these functions may prevent a program from only allocating static memory;
    c) Sometimes, given constant inputs, memory can be allocated statically for the output, but this is an option that may require implementation in the primitive's type propagation routine;
4. Functions that run in-place
    a) These functions operate on strings or arrays, but should not affect the compiler's pre-allocation or reuse of memory;
    b) If any of these are implemented in such a way that they allocate memory, they may need to be re-factored, i.e., re-formulated to use statically allocated memory;
5. Miscellaneous functions
    a) Functions that operate on strings or arrays;
    b) Some functions have interesting properties which are explained in more detail in the "miscellaneous functions" section below.

Figure 6:
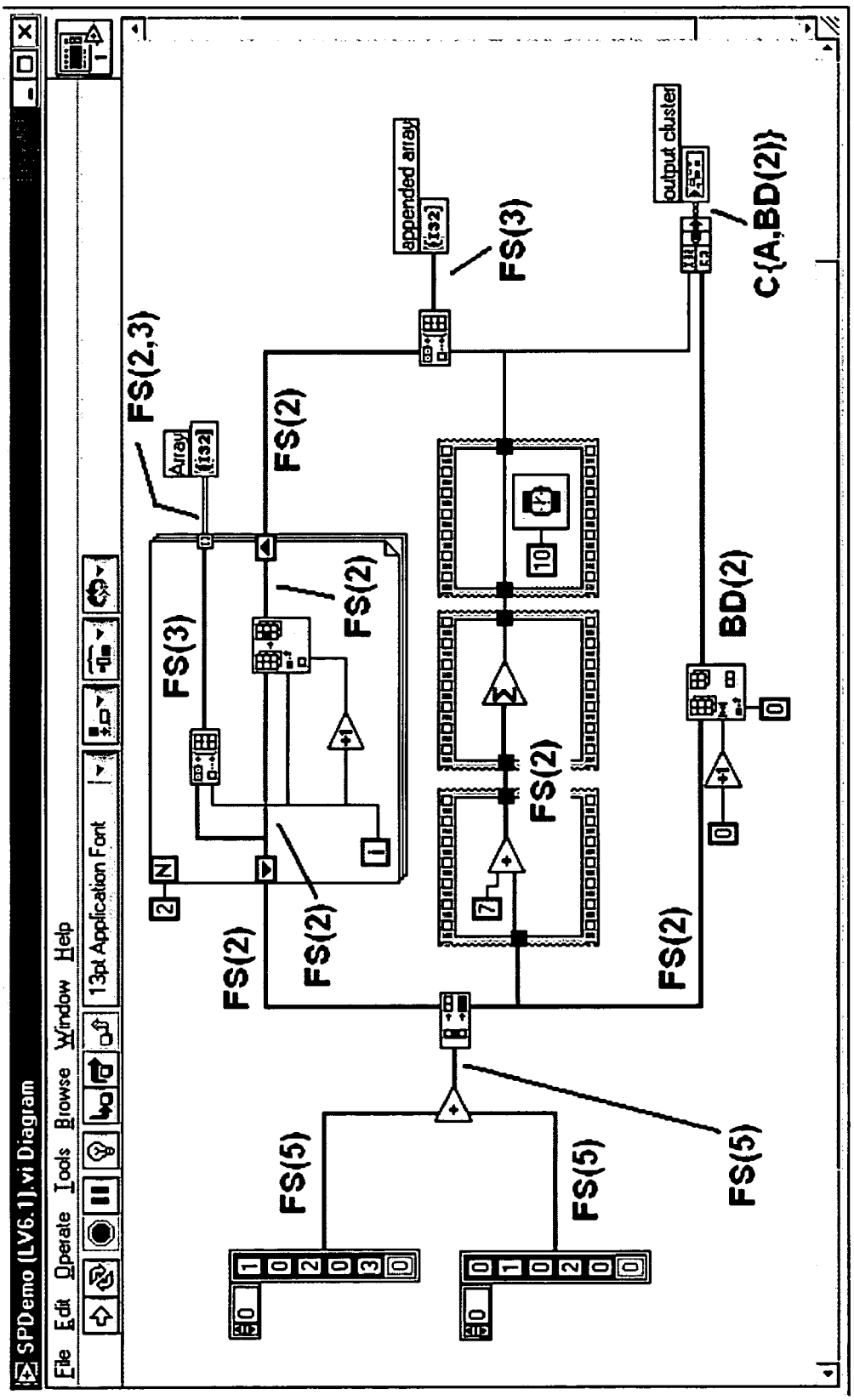
FIG. 6 illustrates assignment of signals on a diagram to constant sized structures, according to one embodiment.

An example of how signals on a diagram can be assigned is illustrated in FIG. 6, in which FS(n) indicates a fixed-size array of size n, BD(n) indicates a bounded array of maximum size n, and C{x} indicates a cluster with contents x.

As the FIG. 6 shows, various fixed-size arrays (FS), bounded arrays (BD), and clusters (C) used in the graphical program may be ascertained. Note that the cluster shown in the bottom right of the diagram includes A, representing an FS(2), as well as a bounded array (BD).

In various embodiments, one or more of the following rules may be used in characterizing and assigning memory requirements for signals. Note that some or all of these rules may also be applied to temporary data elements used in or by function nodes, i.e., to data elements that are not passed between nodes via wires, but are still needed by the functions or nodes to perform their specified functionality.

Any signals coming from array or string constants may be set as fixed size automatically (e.g., with the fixed-size equal to the exact size of the data inside).

When a binary numeric operator has two fixed size arrays as input, it may set its output signal to be fixed-size with the size of its smallest input.

When a decimate array primitive receives a fixed-size array as input, it may assign its output signals to be fixed-size arrays with sizes equal to floor(inputSize/numOutputs).

In and out terminals on tunnels and left-shift registers may use the same fixed-size or bounded array or string, and so memory does not need to be copied. As used herein, the term "tunnel" refers to an element or mechanism to connect signals on the inside of a structure node (for, while, sequence etc) to signals on the outside of a structure node.

Build arrays may calculate the size of the fixed-size or bounded output array by summing the sizes of the inputs arrays.

A "delete from array" primitive may only guess the exact size of its output if constants are wired to its width and index input; otherwise, it may set its output signal to be a bounded array with a maximum size equal to the size of the fixed-size or bounded input array.

Target Syntax Checking

In one embodiment, prior to, or as part of, the analysis of 504, target syntax checking may be performed on the graphical program to determine whether or not memory can be allocated statically for all signals, e.g., for all data elements used in the program. In other words, analyzing the graphical program also include: prior to said determining memory requirements, determining if any of the data elements require dynamic memory allocation, and if the analyzing determines that dynamic memory is required, indicating an error.

For example, if the analysis determines that the program requires dynamic allocation of memory, errors may be indicated at edit time via target syntax checking in the form of broken wires. In one embodiment, the assignment of array and string signals as fixed-size, bounded, or variable may be done at edit time by type propagation, and if any signals have to be assigned as variable, the target syntax checking process may indicate the error, e.g., by presenting a text description of the error, breaking a "run arrow", or otherwise indicating the error in the graphical program.

Functions with Variable Output Size:

The following illustrates some example LabVIEW functions or objects that may require dynamic memory allocation. Also shown are constraints on the use of each function or object, e.g., indicating how the developer may use them to avoid target syntax errors.

Number to string functions (e.g., "Number to hexadecimal string")
    constraint: "width" and "precision" must be constant
Format value
    constraint: the format string must be constant
Format date/time string
    constraint: the format string must be constant
Format into string
    constraint: the format string must be constant
Array to spreadsheet string
    constraint: the format string must be constant
Initialize array
    constraint: the size of the output array must be constant
Reshape array
    constraint: the size of the "dimension size" must be constant
Read file
    constraint: the count input must be constant
TCP read
    constraint: the count input must be constant
UDP read
    constraint: the count input must be constant
While loop w/indexed output terminal
    constraint: the stop condition must be constant
For loop w/indexed output terminal
    constraint: the for loop must either have a constant N, or an indexed input
Timed loop w/indexed output terminal
    constraint: the stop condition must be constant Miscellaneous Functions
Inline C node
    constraint: "malloc" or "free" cannot be used anywhere in user code
Call library function node
    constraint: the library must not allocate memory, but TS won't warn about this
Call by reference node
    constraint: the VI reference must be static
Loop shift registers
    constraint: the array or string fed into the right SR (shift register) must not be bigger than the one fed into the left SR Thus, a target syntax checking process may analyze the functions and data elements in the program to determine if memory allocation constraints are met, and may return an error if they are not.

In one embodiment, if any variable-sized arrays or strings are used in the program, they may be given target syntax "type not supported" errors. The type propagation process may ensure that variable-sized arrays are not instantiated unless they absolutely must, otherwise the developer may be prevented from using some functions that would otherwise be useable.

Figure 7A:
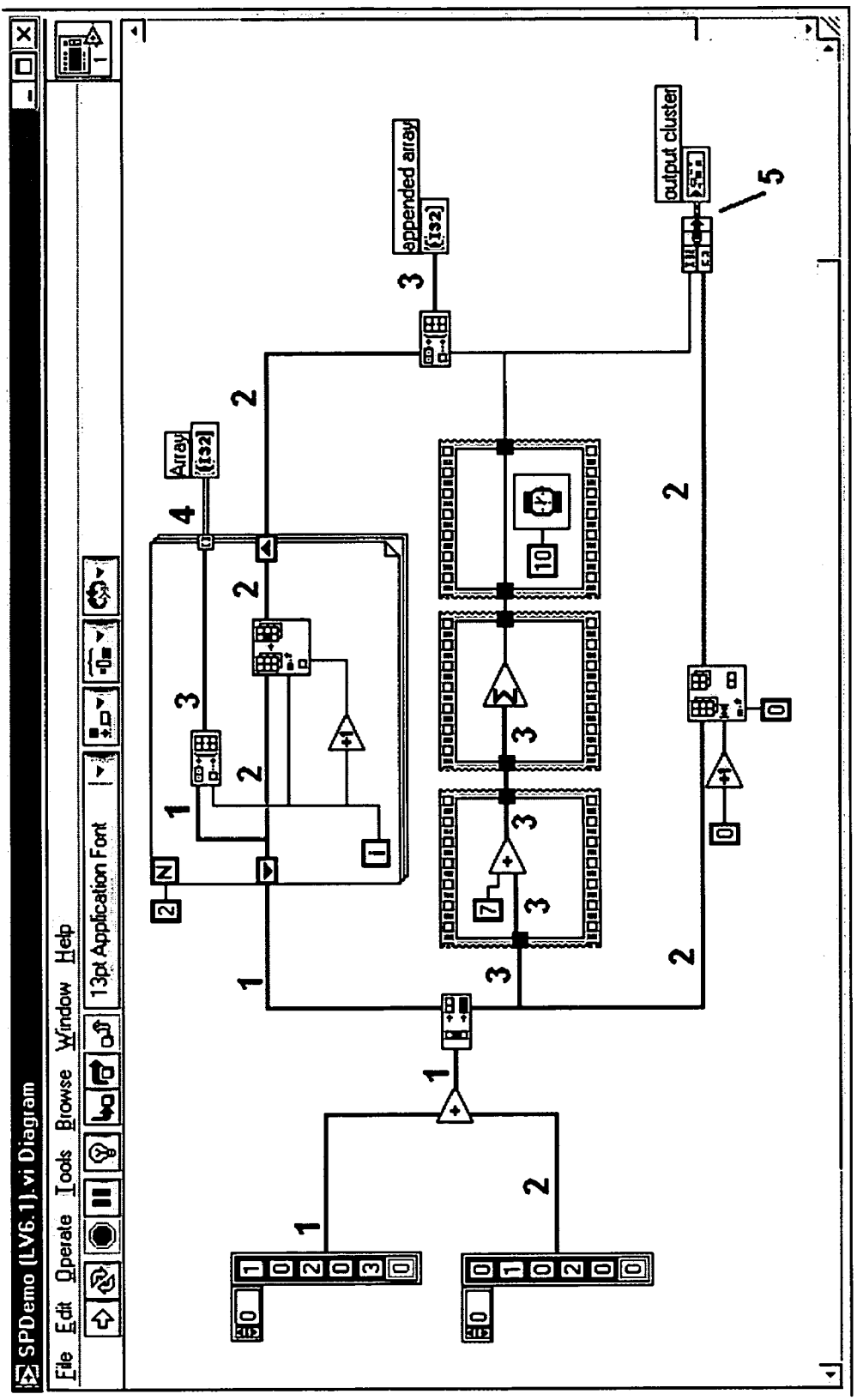
FIGS. 7A and 7B illustrate static path determination in a diagram for serial and parallel execution, according to one embodiment.

FIG. 7A—Serial Implementation

The graphical program or VI shown in FIG. 7A illustrates a process set to execute in series, where static signal paths are labeled, e.g., 1 through 5, each corresponding to a shared statically allocated memory block.

Signal Path 1

As FIG. 7A shows, static path 1 (SP1) starts at a fixed-size array constant with a size of 5, continues to an add node (plus sign), and passes through by convention, while static path 2 (SP2) "dies" (conceptually, its refcount decrements to zero, and so it becomes unused memory).

SP1 then enters a "decimate array" function node (just after the plus sign), where the node is operable to divide elements of an array into two or more output arrays, and where the number of output arrays is equal to the number of output terminals on the node (in this case, two). One of the outputs of the decimate array function node is the right size to fit into this path (in this case, of size 2, which is less than the original size of 5), and so SP1 continues through this output and resizes (in the bounded array sense) to a size of 2.

SP1 then enters a For loop through the left Shift Register (SR), here shown in the top portion of the diagram. SP1 is of size 2, so the For loop's right SR cannot accept any path with a size greater than 2. Note that inside the For loop, the wire that SP1 is on splits, and so by convention it takes the first branch, and SP2 is spawned (actually resurrected, as described below) with a size of 2 to take the other branch Once SP1 exits the For loop, it is fed into a build array function node (far right node on vertical wire), where it dies. Note that signal path 3 (SP3) exits the build array function node.

Signal Path 2

SP2 starts at a fixed-size array constant with a size of 5, and continues to the plus sign, where it is killed, by convention (and where SP1 passes through, as described above). SP2 then gets resurrected where SP1 splits off inside the For loop, where it is passed into a "replace array element" node and fed through (see the node with SP2 entering and leaving the node).

SP2 is then passed to the right SR (shift register), and satisfies the requirement for that SR (mentioned above) that the input is of size less than or equal to 2.

Note that during run time, the contents of the data pointed to by SP2 are copied into SP1 at the end of each iteration of the For loop except the last one. When the For loop ends, SP2 exits the right SR and is passed into the build array function node, where it dies.

SP2 also starts or resumes where SP3 branches off with a size of 2, described below. SP2 passes through a "delete from array" function node (bottom node of diagram), and becomes a bounded array instead of a fixed-size array. SP2 dies on a bundle primitive (bottom right node of the diagram), which operates to bundle two or more data elements into a cluster.

Signal Path 3

Signal path 3 (SP3) starts at the output of the decimate array primitive with a size of 2. The wire SP3 is on splits, and so by convention it takes the first branch, and SP2 is spawned with a size of 2 to take the other branch. SP3 enters a flat sequence structure (three sequential frames or rectangles) through a tunnel, passes through a plus sign, exists through another tunnel, and then enters a summation primitive (in the second sequence frame) where it dies again.

SP3 also starts or resumes at the output of the build array node inside the For loop with a size of 3, and dies on an indexed output, shown on the top wire of the For loop. Note that the contents of SP3 are copied into the appropriate row of an output array (SP4) at the end of every iteration of the For loop.

Since the parallel branch that SP3 is on dies, it becomes available for reuse. Note that the output signal coming from the build array on the right side of the diagram needs to be of size 3, and SP3 is size 3, so SP3 is reused for this signal, as indicated in diagram.

Signal Path 4

SP4 starts after the indexed output from the For loop, and exists only between this output and the input terminal of an "Array" indicator, shown just to the right of the For loop. In this case, the indicator's memory may just be written to directly.

Signal Path 5

SP5 starts after the bundle primitive, and exists only between this output and the input terminal of an "output cluster" indicator, shown in the bottom right of the diagram, and labeled "output cluster".

As the diagram is traversed in the order of execution (which is the order of code generation), new static paths linking to data of the right size may be instantiated when primitives or nodes that generate data are encountered, and placed in a global table of static paths with a refcount of one. This means that the static path is active on the diagram, and may not be used anywhere else. Each primitive or node may have had its output signals' sizes determined at edit-time by the type propagation process, described above. Type propagation routines may attempt to bind the outputs to fixed-size or bounded arrays if possible by using data types, sizes, and values (if constant) of inputs as clues to calculate output sizes. Ideally the static paths entering the inputs can be reused, but if the output must be bigger than the input or if it is the wrong type, then a new static path may be formed to accommodate it and the input static path may die.

The generation of static paths may be driven by type data associated with each signal at edit-time, and the global list of static paths. The type data may include the fixed-size or size bound of arrays and strings, which is what the static path generator needs, and the global SP list may include information about all static paths already in use, and static paths which can be reused.

When any subdiagrams are encountered (a structure node, VI, etc), the process may recurse on these subdiagrams, as noted above, "passing" input SPs in through tunnels or controls and then feeding out other static paths.

Where the static path enters a structure that executes the same diagram multiple times (a loop), a new static path may be made starting at the out terminal of the input tunnel. The contents of the data in the original static path may be copied into the data in the new static path at the beginning of every iteration of the loop. The static path entering the loop may stay active until the loop is finished executing, at which point its refcount may be reduced to zero so it may be released to the free static memory pool.

When a static path terminates, its refcount may be reduced to zero, signaling the compiler that it can reuse it whenever it wants elsewhere. Static paths are preferably always active until they terminate.

Figure 7B:
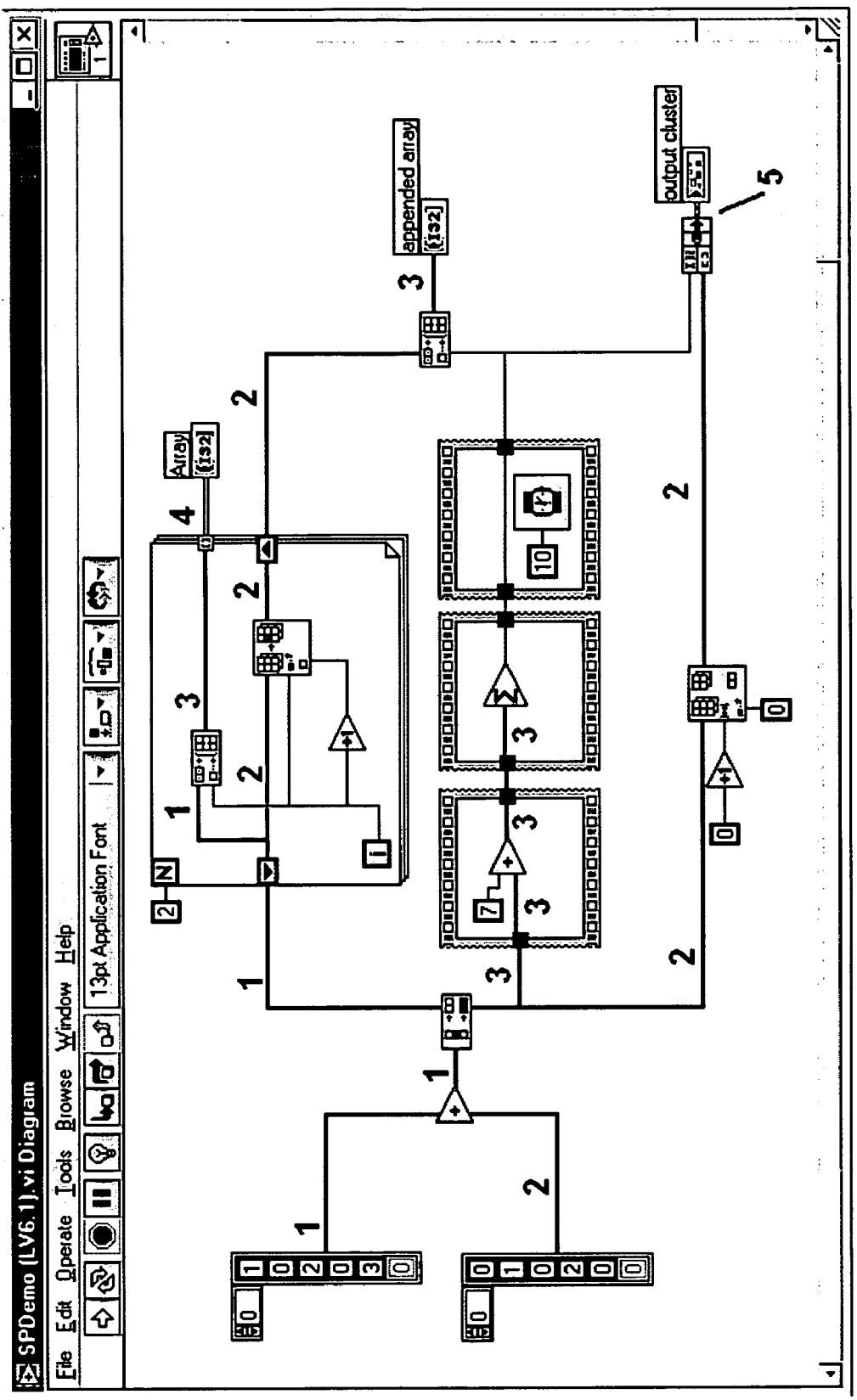

FIG. 7B—Parallel Implementation

FIG. 7B illustrates static path labeling for a parallel execution of the VI of FIG. 7A. As FIG. 7B shows, the graphical program's static paths are labeled, e.g., 1 through 7, each corresponding to a shared statically allocated memory block. As may be seen, many of the static paths are the same as those of FIG. 7A.

Signal Path 1

As FIG. 7B shows (similar to 7A), static path 1 (SP1) starts at a fixed-size array constant with a size of 5, continues to the add node (plus sign), and passes through by convention, while static path 2 (SP2) "dies".

SP1 then enters the "decimate array" function node (just after the plus sign). One of the outputs of the decimate array function node is the right size to fit into this path (in this case, of size 2, which is less than the original size of 5), and so SP1 continues through this output and resizes (in the bounded array sense) to a size of 2.

SP1 then enters the For loop through the left Shift Register (SR). SP1 is of size 2, so the For loop's right SR cannot accept any path with a size greater than 2. Note that inside the For loop, the wire that SP1 is on splits, and so by convention it takes the first branch, and SP2 is spawned (actually resurrected, as described below) with a size of 2 to take the other branch Once SP1 exits the For loop, it is fed into a build array function node (far right node on vertical wire), where it dies. Note that signal path 3 (SP3) exits the build array function node.

Signal Path 2

SP2 starts at a fixed-size array constant with a size of 5, and continues to the plus sign, where it is killed, by convention (and where SP1 passes through, as described above). SP2 then gets resurrected where SP1 splits off inside the For loop, where it is passed into a "replace array element" node and fed through (see the node with SP2 entering and leaving the node).

SP2 is then passed to the right SR (shift register), and satisfies the requirement for that SR (mentioned above) that the input is of size less than or equal to 2.

Note that during run time, the contents of the data pointed to by SP2 are copied into SP1 at the end of each iteration of the For loop except the last one. When the For loop ends, SP2 exits the right SR and is passed into the build array function node where it dies.

As shown, SP2 also resumes where SP3 branches off with a size of 2, passes through the "delete from array" function node (bottom node of diagram), and becomes a bounded array instead of a fixed-size array. SP2 then dies on the bundle primitive.

SP2 starts at a fixed-size array constant with a size of 5, and continues to the plus sign, where it is killed, by convention (and where SP1 passes through, as described above). SP2 then gets resurrected where SP1 splits off inside the For loop, where it is passed into a "replace array element" node and fed through (see the node with SP2 entering and leaving the node).

SP2 is then passed to the right SR (shift register), and satisfies the requirement for that SR (mentioned above) that the input is of size less than or equal to 2.

Note that during run time, the contents of the data pointed to by SP2 are copied into SP1 at the end of each iteration of the For loop except the last one. When the For loop ends, SP2 exits the right SR and is passed into the build array function node, where it dies.

Signal Path 3

Signal path 3 (SP3) starts at the output of the build array node inside the For loop with a size of 3, and dies on an indexed output, shown on the top wire of the For loop. Note that the contents of SP3 are copied into the appropriate row of an output array (SP4) at the end of every iteration of the For loop.

Since the parallel branch that SP3 is on dies, it becomes available for reuse. Note that the output signal coming from the build array on the right side of the diagram needs to be of size 3, and SP3 is size 3, so SP3 is reused for this signal, as indicated in diagram.

Signal Path 4

SP4 starts after the indexed output from the For loop, and exists only between this output and the input terminal of an "Array" indicator, shown just to the right of the For loop. In this case, the indicator's memory may just be written to directly.

Signal Path 5

SP5 starts at the output of the decimate array primitive with a size of 2. The wire SP5 is on splits, and so by convention it takes the first branch, and SP6 (described below) is spawned with a size of 2 to take the other branch. SP5 enters the flat sequence structure (three sequential frames or rectangles) through a tunnel, passes through the plus sign, exists through another tunnel, and then enters the summation primitive (in the second sequence frame) where it dies again.

Signal Path 6

SP6 starts where SP5 branches off with a size of 2, passes through the "delete from array" function node (bottom node of diagram), and becomes a bounded array instead of a fixed-size array. SP6 then dies on the bundle primitive.

Signal Path 7

SP7 starts after the bundle primitive, and exists only between this output and the input terminal of an "output cluster" indicator, shown in the bottom right of the diagram, and labeled "output cluster", similar to SP5 described above with reference to FIG. 7A.

Thus, the idea of static paths for reusing memory in the parallel execution case may be used as for the serial execution case, but may be more difficult to assign these paths.

Generation of static paths may still be driven by type data built at edit-time and by the global static path list, but more data may be necessary to ensure that a static path is not used in two parallel branches, e.g., a data structure containing data indicating parallel relationships between paths. This data structure may change every time a set of static paths enters a primitive or node and a different set of static paths leave, may be consulted every time a new static path has to be chosen for the output of some primitive or node, and may let the static path generator know which static paths can be used and which ones cannot.

Where a wire splits, the split may be treated like a function that takes in the array or string and outputs N copies of it, where N is the number of out terminals for the wire. One of these branches that the wire splits to may use the static path that is being split, but the others must use new static paths that are a copy of the original, and the data may be copied from the original into the split-offs at run time. This may not apply, however, to branches of the wire split that die immediately. No new static path needs to be assigned to them because there are no new signals involved.

Whenever a set of static paths die inside a subdiagram, e.g., a sequence structure performing some array operations and producing data which is not passed out, these static paths may be released to be reused in the branch that continues after the subdiagram executes. In the case of a loop, this may occur anyway at run time because the subdiagram is executed multiple times and uses the same signals each iteration. In the case of a sequence structure, this means that any static paths used in a frame that are not passed out or sent to sequence locals may be used in later frames or used after the sequence structure executes. Case and event structures may be treated like one-frame sequence structures in this context.

Whenever a set of static paths enter a LabVIEW object and another set exits the LabVIEW object, the dependencies between the elements in the set entering the LabVIEW object may be broken, and dependencies between the elements of the set exiting the block may be generated. This may ensure that the parallel branches that originate after the block do not use the same static paths, and that the requirements binding static paths between the parallel branches that just died (in relation to each other) no longer exist. When the static paths entering the object converge on it, they no longer become parallel, removing the requirement that they do not use the same static paths.

A static path is said to "use" another static path by splitting it off from itself when it needs to. The signal table and the static path relationship data structure may specify which static paths a given static path can use.

The primary differences between the parallel reuse scheme and the serial implementation include:

In the parallel implementation, since SP3 may be in use in the branch with the For loop, the parallel branch with the flat sequence structure needs to spawn SP5 and use it instead. Similarly, since SP2 may be in use in the branch with the For loop, the parallel branch with the delete from array primitive needs to spawn SP6.

In the parallel implementation, a new SP needs to be spawned for the cluster (array and string memory cannot be mutated at run time to be used for a cluster), and SP7 happens to be the next available static path (instead of SP5)

More details regarding these processes are presented below.

In 506, one or more static memory allocations may be programmatically included in the graphical program in response to the analysis of 504, where the one or more static memory allocations may be executable to statically allocate shared memory blocks for each of the one or more subsets of data elements. In other words, any dynamic memory allocations in the program may be replaced with static memory allocations. Note that these replacements may not be "one to one" with respect to the dynamic allocations, since where possible, one static memory allocation, i.e., one statically allocated memory block, may be used in place of several dynamic memory allocations.

Thus, each of the subsets of data elements determined above in 504 may be assigned a respective static memory allocation, or, said another way, a static memory allocation for each subset may be determined, and code (graphical and/or text-based code) generated specifying the allocations.

In some embodiments, the graphical program may include one or more graphical sub-programs, each comprising a respective plurality of interconnected nodes which visually indicate functionality of the graphical sub-program, where each graphical sub-program includes a respective plurality of data elements. For example, in a LabVIEW based embodiment, the graphical program may include one or more nodes which each represent or call another graphical program. Such nodes are referred to as subVIs (sub-virtual instruments). Thus, analyzing the graphical program may include analyzing the one or more graphical sub-programs, where at least one of the one or more subsets of the plurality of data elements includes data elements from the graphical program and at least one of the one or more graphical sub-programs, or, wherein the one or more graphical sub-programs comprise a plurality of graphical sub-programs, at least two of the plurality of graphical sub-programs. In other words, one or more of the static memory allocations or memory blocks may be applied or used for data elements spanning multiple graphical programs or block diagrams, e.g., multiple VIs.

Finally, in 508, the graphical program may be executed, where executing includes executing the one or more static memory allocations in the graphical program to statically allocate the shared memory blocks for each of the one or more subsets of data elements.

Creating the Graphical Program

The following describes one embodiment of a method for creating a graphical program operable to receive and respond to user interface events. It is noted that method elements in the following flowcharts may occur concurrently or in different orders than that shown.

A graphical user interface or front panel for the graphical program may be created, e.g., in response to user input. The graphical user interface may be created in any of various ways, e.g., depending on the graphical programming development environment used. A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

The graphical program may then be executed. The graphical program may be executed on any kind of computer system(s) or reconfigurable hardware, as described above.

Code Generation

In a preferred embodiment, the graphical program may be used to generate a text-based program, which may then be compiled and executed. For example, in one embodiment, a C program may be generated based on the graphical program, e.g., for deployment onto an embedded device. Thus, after the signals (and possibly temporary data elements) have been characterized and assigned at edit time, the information may be used by a C generator to create static memory allocations and assign heap pointers to correct blocks of memory. Said another way, the method may generate program code/objects based on the analysis of 504, where the program code/objects may be executable to make the static memory allocations for the signals and/or the temporary data elements. In a preferred embodiment, the generated code or objects may themselves be code generators which are executable to generate the static memory allocations. For example, the generated code or objects may generate program instructions in the program that specify or declare the static memory allocations, e.g., as part of a more general code generation process, whereby the graphical program is used to generate the text-based version of the program. Thus, the method may include generating executable code based on the graphical program, and executing the executable code, including executing the one or more static memory allocations in the graphical program to statically allocate the shared memory blocks for each of the one or more subsets of data elements. A detailed example of this approach is described below.

Example Implementation

The following describes a preferred embodiment of an implementation of the method of FIG. 5. More specifically, the following describes an implementation of an embodiment of the method that includes optional target syntax checking. This particular implementation is directed toward a LabVIEW based graphical program (i.e., in the "G" graphical programming language, provided by National Instruments Corporation), although as noted above, this techniques described herein are broadly applicable to other graphical programming systems, as well. Note that while the following is described in terms of two stages or phases, namely, a memory pre-allocation stage and a memory reuse state, this organization is for explanation purposes only, and is not intended to limit the invention to any particular organization, i.e., in other embodiments, the functionality described below may be performed in more or less stages or phases as desired.

In the specific embodiment described below, a code generation process converts the graphical program to a text-based program, e.g., a C program, e.g., for deployment onto an embedded device, although it should also be noted that in other embodiments, the graphical program may not be converted to a text-based program, but rather, may be modified directly, and executed, e.g., by a graphical program execution engine.

Target Syntax Checking

As mentioned above, in some embodiments, target syntax checking may be performed on the graphical program to ensure that none of the functions in the program require dynamic allocation. For example, in one object oriented embodiment, a TargetSyntax class may be provided that includes public methods that allow target syntax data to be modified after it has been loaded. For example, public methods may be provided for modifying included/excluded lists for primitives, nodes, sub-VIs (graphical sub-programs), and types, as well as "miscellaneous" data, as desired.

In one embodiment, functions may be exported from LabVIEW that wrap these public methods, allowing external sources to modify LabVIEW's target syntax checking behavior. In another embodiment, a "G" API may be made to wrap these exported functions allowing LabVIEW code to modify the target syntax checking process. It should be noted that the various class and function names presented herein are meant to be exemplary only, and are not intended to limit the invention to any particular set of class or function names.

Project plug-ins may be provided so that user-specified code can be called when the project opens and closes, and when the user switches targets, allowing TS behavior to update based on project settings changing. In one embodiment, the plug-ins may allow a static memory allocation mode to be set or unset based on project settings.

Note that variable-sized arrays and strings may effectively be disabled in this static memory allocation process.

As noted above, in preferred embodiments, the analysis of 504 may determine static paths in the graphical program where signals or data elements may share statically allocated memory blocks.

The following describes several ways to reuse statically allocated memory in serial and parallel execution environments. As described above, the memory reuse process may walk or traverse through the diagram and identify static paths, i.e., paths of wire along which the same statically allocated block of memory may be used. An application that can have completely static memory allocation is preferably made up entirely of static paths, and preferably has as few static paths as necessary.

As described above, the process may perform differently for serial and parallel execution. A serial execution of the code is generally much more predictable and controlled, and so memory may typically be reused more frequently. In parallel execution of the program, due to the inherent unpredictability of timing differences between parallel branches it may generally be impossible to reuse memory used in one branch in a different branch. FIGS. 7A and 7B, described above, respectively illustrate example static paths in graphical programs in parallel and series implementations.

Memory Pre-Allocation

The following describes an example LabVIEW based implementation of the memory pre-allocation stage, according to one embodiment. Note that the functions described are meant to exemplary only, and are not intended to limit the functions or objects of the present invention to any particular set.

In one embodiment, the fixed-size or size bound for a signal may be assigned, e.g., in a typeprop function (e.g., an "ArropTypeProp" function or equivalent) for the LabVIEW object at its root. For example, a signal that starts after a split array primitive may have its properties assigned in a "pSplitArr" case of a case structure in "ArropTypeProp". In one embodiment, there may be a section in this case that has "#if PreAllocate" (or equivalent) around it and that details what to do if the preallocation option is chosen Regarding the C generator, a function such as "CGenObject::M_dataTable->IsStatic(GetObjID( ))" (or equivalent), may be provided to indicate if an object is static. Note that if the "static memory allocation" option is selected, substantially everything (data elements) will be static (because there will not be any variable-length arrays or strings).

The C generator may modify any function in the runtime that requires dynamic memory allocation to instead pre-allocate the required amount of memory, and pass a pointer to the pre-allocated buffer to the generated function call.

This phase may be considered to be complete when it is verified that no memory is allocated in the generated code when static arrays and strings are used. Note that while in these examples, a C generator generates C code, in other embodiments, programming code in any other language may be generated, e.g., JAVA, C++, BASIC, and so forth.

Memory Reuse

Before C generation occurs, all static paths in the application may be found, and all signals assigned to their static paths. In one embodiment, this process may occur in a compiler pre-pass, e.g., in an AllocPrePass function or process. As noted above, in some embodiments, the static memory allocation (and reuse) techniques described herein may be used in systems that rely on code-generation from the graphical program, such as LabVIEW Embedded, as well as systems that keep the graphical program in graphical form, such as the standard LabVIEW (Desktop) version, both provided by National Instruments Corporation.

In one embodiment, the C generator may make use of pre-compiler information to operate more effectively. For example, a global signal table and global static path dependency graph (SPDG) may be created before the diagram traversal begins and may aid in assigning static paths in an optimal fashion. In one embodiment, signals in the signal table may point to the memory allocated for static paths of which they are a part.

The SPDG may be built and used during static path assignment. Note that its instantaneous value during the static path assignment process may be important, while the value it has after this process may not. For a static path X, the SPDG may contain a vertex for static path X, and an edge directly linking static path X to each static path that it is considered parallel to.

In the SPDG creation process, before top-level diagram processing begins, the SPDG may be empty. The diagram may be traversed using the following rules for updating the SPDG every time a set of static paths enters any node and a different set of static paths leave.

Figure 8B:
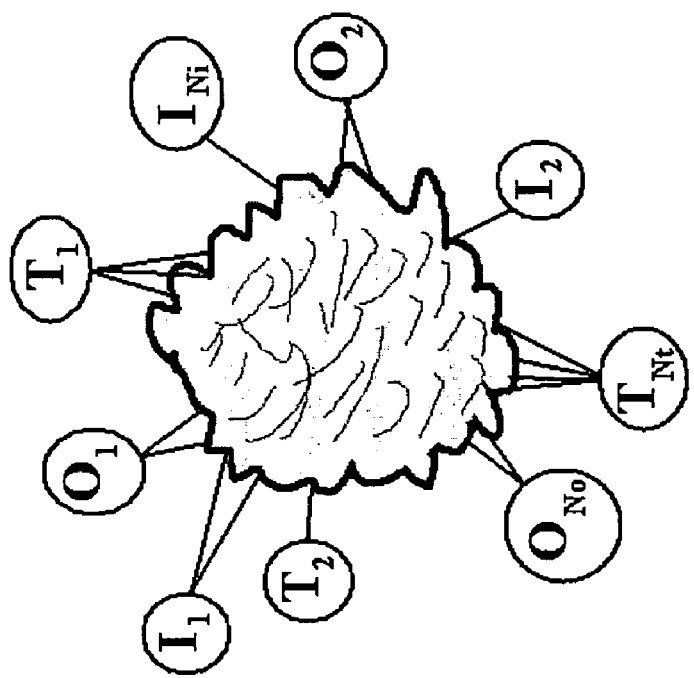
FIG. 8B illustrates one embodiment of a static path dependency graph (SPDG)
Figure 8A:
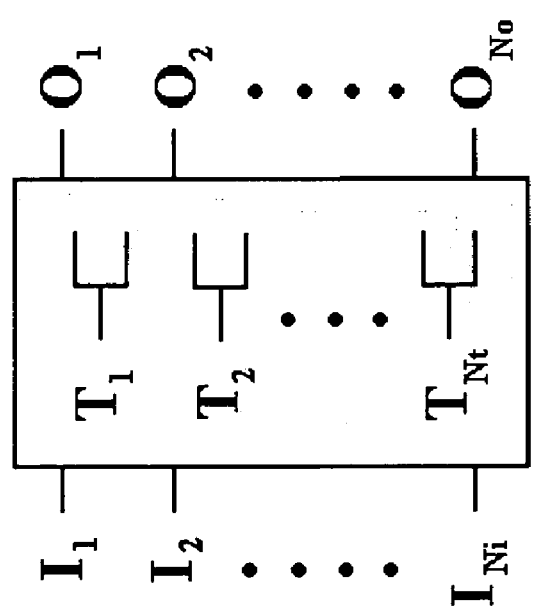
FIG. 8A illustrates an exemplary graphical program object, according to one embodiment.

FIG. 8A illustrates a graphical program object, according to one embodiment. For example, the object may represent a LabVIEW block diagram object. As FIG. 8A shows, the object includes a set of inputs {I1, I2, . . . , INi}, a set of outputs {O1, O2, . . . , ONo}, and a set of intermediate signals {T1, T2, . . . , TNt}.

FIG. 8B illustrates one embodiment of a static path dependency graph (SPDG). As FIG. 8B shows, the SPDG includes vertices for the static paths significant to the object in FIG. 8A.

In one embodiment, the method may utilize the following two processing steps:

SPDG Node Input Processing Step:

Each input static path (SP) vertex's connection set may be unified with the input SPs' vertices' greatest common connection set. When all input SPs converge on the node in FIG. 8A, they cease to be parallel to each other. All connection sets may be unified to enforce the axiom that when the SPs converge, they become conceptually like one SP parallel to whatever the shortest SP is parallel to. The shortest SP may be parallel to the fewest other SPs.

More specifically:

For each input $I_k$, find the SPDG graph vertex $V_k$ associated with input $I_k$, and find the set of all vertices $CS_k$ connected directly to $V_k$.

Find the greatest common connection set (GCCS) (or subset) in the set of lists {CS1, CS2, . . . , CSNi}, e.g., $GCCS = CS_1 \cap CS_2 \cap \ldots \cap CS_{Ni}$.

For each connection set $CS_k$, modify the graph such that $CS_k = GCCS$.

SPDG Node Output Processing Step:

Connect all output SP vertices to each element in the input SPs' vertices' GCCS.

All output SPs may be parallel to everything that the input SPs are all parallel to because the unified SP representing all input SPs continues from the outputs of the node in FIG. 8A.

Connect all output SP vertices to each other. All output SPs are parallel to each other, because they start at the same point and branch outward.

Disconnect all intermediate signal SP vertices from all output SP vertices. These SPs may only be used inside the node under consideration, so they can safely branch off later from the output SPs.

More specifically:

For each output $O_k$, find the SPDG graph vertex $V_k$ associated with output $O_k$, find the set of all vertices $CS_k$ connected directly to $V_k$, and modify the graph such that $CSk = CS_k \cup GCCS$, where "U" represents the union operator.

For each output $O_k$, modify the graph such that $CS_k = CS_k \cup V_1 \cup \ldots \cup V_{k-1} \cup V_{k+1} \cup \ldots \cup V_{No}$. For each intermediate signal $T_j$, modify the graph such that $CS_k \cap T_j = \{ \}$.

A step-by-step trace of the SPDG construction for a diagram is described below (after this section).

The diagram may be traversed in a manner similar to a depth-first search. For example, the traversal may start by pushing all objects (e.g., LabVIEW objects) onto the stack that have all "ready" input signals, i.e., whose input signals are all present. Static paths associated with input controls or tunnels may be noted and used properly when the diagram traversal begins.

In each iteration a LabVIEW object may be popped from the stack, all of its input static paths set as free, and the SPDG node input processing step (explained above in detail) performed. Any sub-diagrams contained in the node may be recursed, i.e., may be processed recursively.

The static path that can be used for each output signal may then be determined. For example, in one embodiment, all existing free static paths may be greedily checked for candidacy, and the first available free static path used. Note that an SP is a candidate for reuse if it is (checked short-circuit in this order): free; the right type; not parallel to any of the inputs to the object, or big enough. If it passes all other conditions but the size condition, the SP can be grown (in the bounded sense) and reused. This feature relies on a "size augmentation rule", a case for which is described below. If there are no suitable free paths, a new static path may be spawned.

The SPDG node output processing step may then be performed (explained above in detail). All of its output signals may be set to "ready", and the objects attached to its output signals may be checked to see if they are ready, and if so, pushed onto the stack.

When the diagram traversal is complete, i.e., including any recursion, all output indicators or tunnels may save their associated static paths.

Once the top-level diagram traversal is complete, all signals have preferably been assigned to static paths, in which case C generation can commence, or, in the case that some dynamic paths are found, compiler errors may be presented.

Figure 9A:
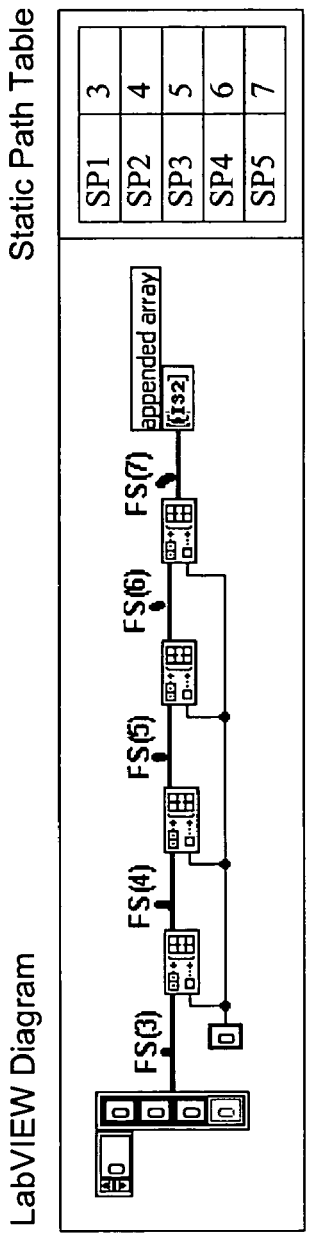
FIGS. 9A and 9B illustrate a size augmentation rule for static memory allocation, according to one embodiment.
Figure 9B:
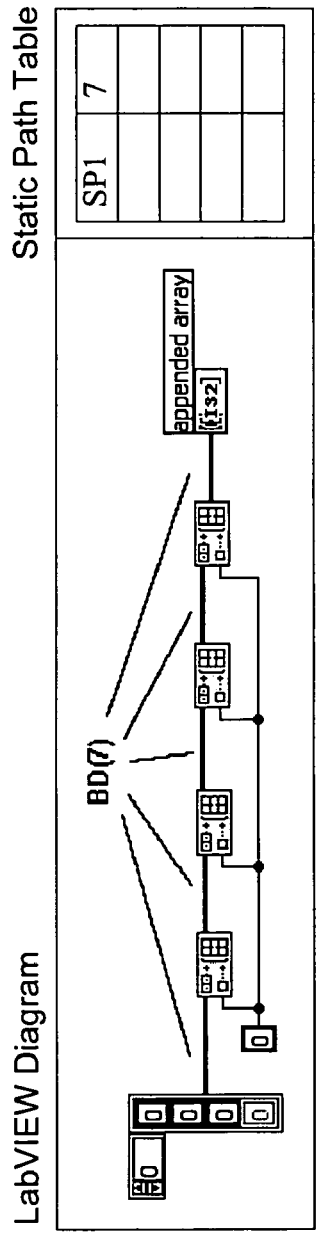

FIGS. 9A and 9B—Size Augmentation Rule

A size augmentation rule refers to a process of increasing the size of a static memory allocation for a data element to accommodate a larger data element such that the same statically allocated memory block may be used (sequentially) by both data elements. Note that the rule may be applied successively for various data elements. FIGS. 9A and 9B illustrate the use of the size augmentation rule, according to one embodiment.

FIG. 9A illustrates a graphical program or block diagram that includes or utilizes a series of fixed size (FS) arrays of sizes 3, 4, 5, 6, and 7, respectively. A FIG. 9A indicates, without a size augmentation rule, the following diagram—SP (static path) assignment pairs would be made:

| SP1 | 3 |
| --- | --- |
| SP2 | 4 |
| SP3 | 5 |
| SP4 | 6 |
| SP5 | 7 |

In other words, because the respective sizes of the memory blocks required for each data element are unique to that data element, a simple requirements-based analysis and determination of static paths results in five separate static allocations of the indicated sizes.

However, this can easily be optimized to use only one bounded memory space of size 7. FIG. 9B illustrates the same graphical program or block diagram, but with memory assignments made using the size augmentation rule.

Whenever a node is encountered that has some outputs that are larger than some of its inputs, it can be in-place on as many input static paths as possible by growing their data spaces. An example of an input static path it could not be in-place to is one connected to an LSR inside a loop. The diagram—SP assignment pair of FIG. 9B is clearly a better one than those of FIG. 9A: SP1 7

Thus, by repeated application of the size augmentation rule, a single static allocation of size 7 suffices for all of the data elements, thus limiting the number of static paths of the diagram to one.

FIGS. 10A-10G Memory Reuse Example

FIGS. 10A through 10G illustrate one embodiment of a memory reuse process. Note that the examples shown are based on LabVIEW block diagrams, and are meant to be exemplary only, and are not intended to limit the invention to any particular form or functionality.

Each of FIGS. 10A through 10G includes a block diagram (graphical program), static path assignments (if any) in the form of a static path table, and a static path dependency graph.

Figure 10A:
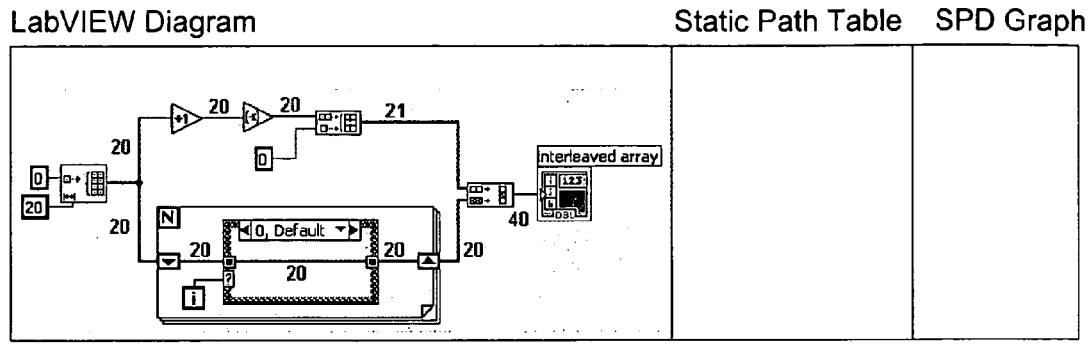
FIGS. 10A-10G illustrate one embodiment of a statically allocated memory reuse process.

FIG. 10A illustrates the graphical program or block diagram (in this example, a LabVIEW diagram) with all signals' fixed sizes labeled. Note that in these examples, the gray parts of the diagram are those that remain unprocessed, thus the entire diagram of FIG. 10A remains to be processed, and so both the SP table and SPDG are empty.

Figure 10B:
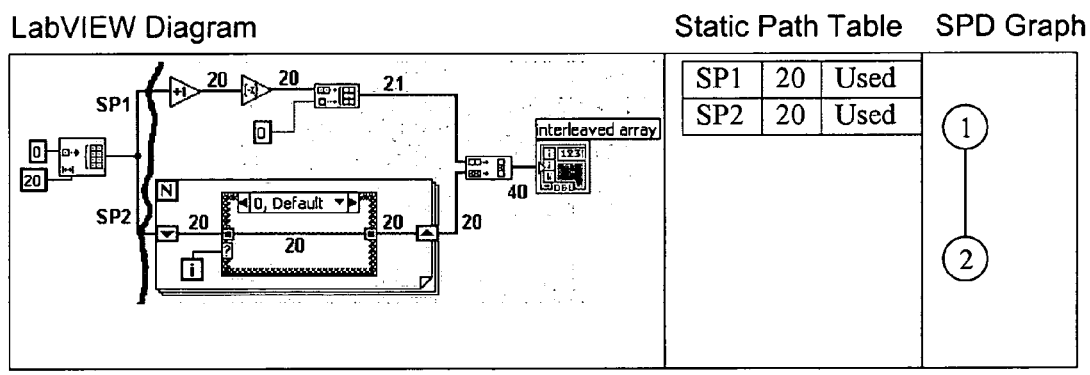

FIG. 10B illustrates the determination of static paths 1 and 2, based on the analysis of memory requirements of the first graphical program node, i.e., the function node on the far left of the diagram. This node is shown requiring a size of 20, which determines the size of signal on the wire exiting the node, and upon each of the wires after the split. Thus, as shown, SP1 and SP2 are formed, both with a size of 20, from the wire split. Their respective entries are placed in the SP table, and the SPDG is changed to reflect their parallel dependency. Note that since SP1 and SP2 are parallel, SP1 cannot split and use SP2, and SP2 cannot split and use SP1.

Figure 10C:
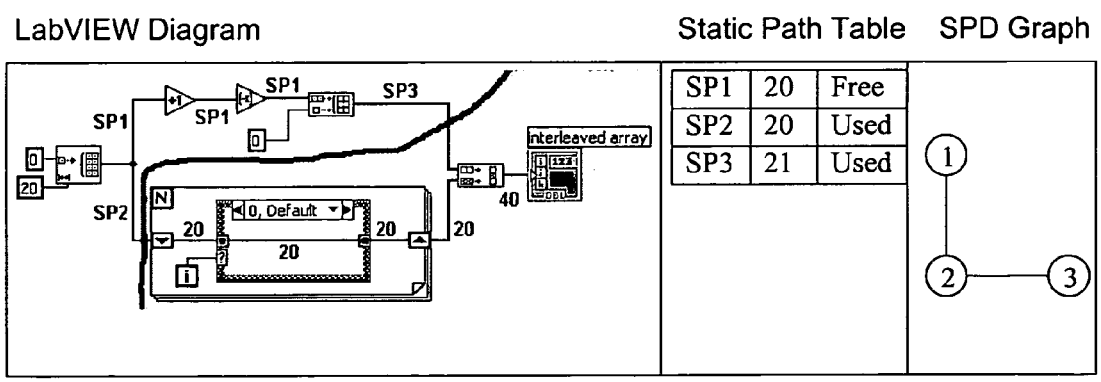

FIG. 10C illustrates the determination of static path 3, based on the analysis of memory requirements of the "build array" graphical program node, i.e., the function node between SP1 and SP3 on the top wire of the diagram. As FIG. 10C shows, SP1 passes through a +1 node, indicated by the triangle labeled "+1", because this is an in-place function. SP1 then passes through a (-x) node, because this also is an in-place function.

SP3 (with a size of 21) is spawned at the output to the build array because neither SP1 nor SP2 is free. Note that neither SP1 nor SP2 has a large enough size to accommodate the memory requirements of the wire exiting the build array node, and that SP2 is parallel; however, in this embodiment, these conditions are not checked.

As FIG. 10C shows, the entry for SP3 is placed in the SP table, SP1 is changed to "Free" in the SP table, and the SPDG is changed to reflect the fact that SP3 is now parallel to SP2 (as well as SP1). Note that SP2 cannot "use" (split off into) SP1 now, even though it is free, because there is no way to tell which branch will execute faster, and when SP2 would be clear to use SP1.

Figure 10D:
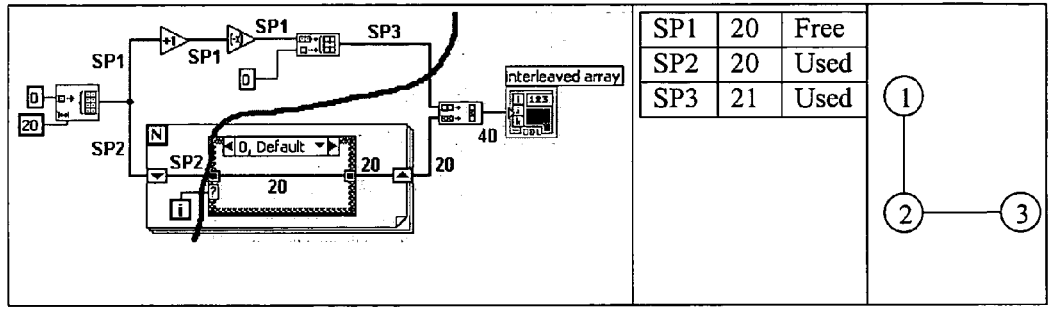

In FIG. 10D, the subdiagram for the for loop is entered, and the analysis method recurses, treating the contents of the For loop as a sub-VI's block diagram, and the left shift register (LSR) as a control. As shown, SP2 is passed into the LSR control.

Figure 10E:
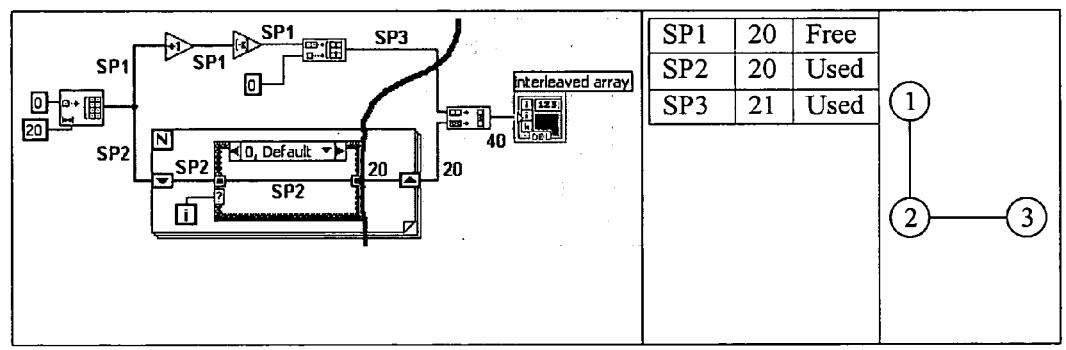

In FIG. 10E, a case structure is encountered during the traversal of the For loop's diagram, and the analysis method recurses into the case structure's subdiagrams. All subdiagrams of the case structure are traversed, and for each out tunnel, a worst-case (largest) size is calculated. Since the subdiagrams of the case structure are treated like sub-VI block diagrams, the out tunnels may be treated like indicators.

Figure 10F:
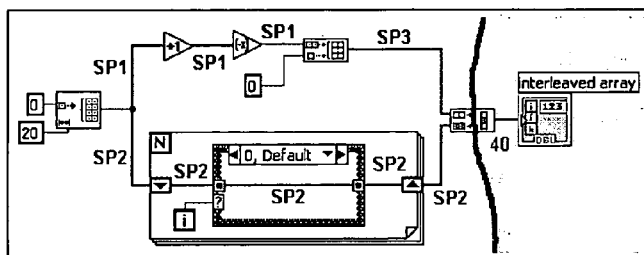

In FIG. 10F, the analysis continues with the output of the case and For loop. All subdiagrams of the case structure feed the input SP through, so the output SP may be assigned as SP2. The recursive calls to the case structure's subdiagrams pop off the execution stack, then SP2 is passed out to the For loop's right shift register (RSR). Note that the RSR is the For loop's only output, and so the processing of the For loop's diagram is complete, and it may be popped off the execution stack.

Figure 10G:
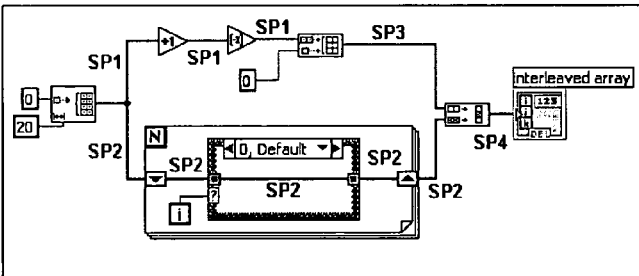

In FIG. 10G, the analysis continues with an "interleave array" node or primitive, shown on the far right of the diagram. The interleave arrays primitive's input signals are ready, so its inputs may be processed. As shown, in the SPDG, SP2 is connected to SP1 and SP3, and SP3 is connected to SP2. The GCCS (greatest common connection set) of SP2 and SP3 is the empty set, and so SP2 and SP3 have their outgoing edge sets updated to the empty set (all connections broken). Then, SP4 (in the SPDG) may be connected to everything in the GCCS, and SP4 is connected to itself. Note that this does not result in any edges being added to the graph.

The SP table is changed to reflect the new freedom of SP2 and SP3, because they both die on the inputs to the interleave arrays primitive. The SPDG is updated to properly reflect the new status of the static paths. More specifically, since SP2 and SP3 are no longer parallel, this dependency is removed from the graph. Furthermore, since SP1 & SP2 are no longer parallel, and this dependency is removed as well. SP4 is free to split off into SP1, SP2, or SP3, and this is evident in the SPDG because SP4 is not connected to anything.

FIGS. 11A-11D—User Interface

In preferred embodiments, a user interface, e.g., a graphical user interface (GUI) may be provided for invoking and managing the functionality described herein. The following describes one embodiment of such a GUI, although it should be noted that the GUI shown is meant to be exemplary only, and is not intended to limit the interface to any particular form, function, or appearance.

Project Manager

In some embodiments, a project manager may be provided for facilitating user management of one or more target applications. The example dialogs described below are directed to an interface for managing embedded applications, e.g., for deployment on embedded devices, although any other types of applications and interfaces are also contemplated, the techniques described herein being broadly applicable to any type of application that may benefit from shared static memory allocation. In one embodiment, each target may have an option in the project manager that lets the user select whether an application should allocate memory statically, or not.

Figure 11A:
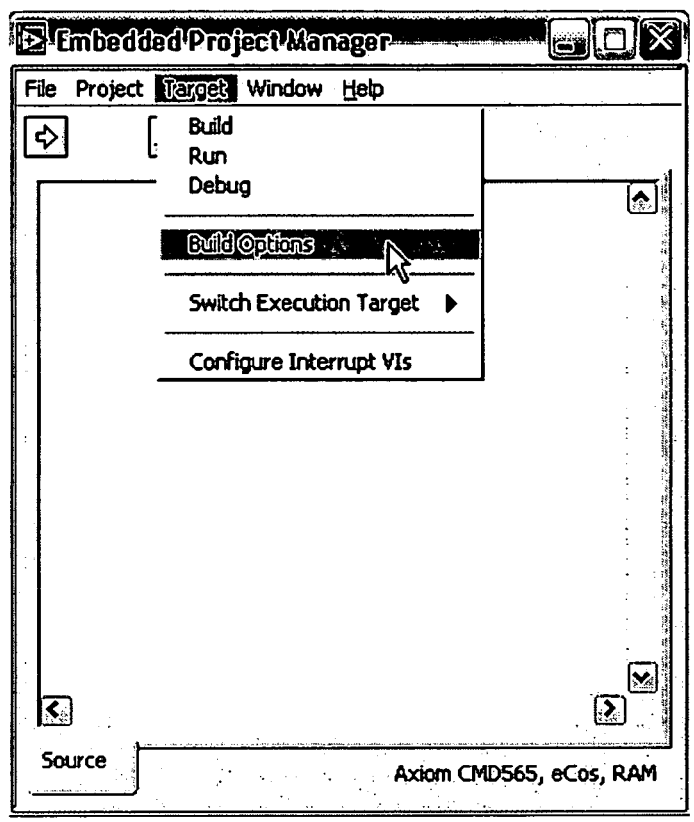
FIGS. 11A-11D illustrate a graphical user interface for static memory allocation in a graphical programming system, according to one embodiment.

FIG. 11A illustrates an example interface for an embedded project manager. In the embodiment shown in FIG. 11A, the user is shown selecting a Build Options menu item for the target.

Figure 11B:
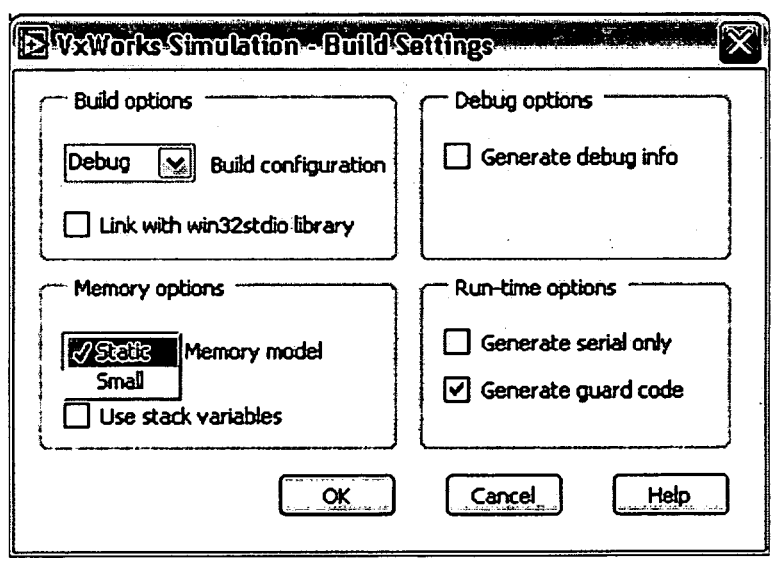

Selection of the Build Options menu item may invoke display of a corresponding dialog, one embodiment of which is shown in FIG. 11B. As FIG. 11B shows, a Build Settings dialog may present options to the user regarding how the target is to be built, including, for example, build options, memory options, debug options, and run-time options, although these options are meant for example only, and other option sets may be included as desired.

As may be seen, a "Static" option under "Memory allocation" may be presented, e.g., for all embedded targets. In some embodiments, it may be the responsibility of a target's plug-ins to provide this option and the target syntax switching code that supports it.

In one embodiment, this dialog may make a call into the executable (e.g., a LabVIEW executable program) when it closes if the user changes this option (the "Static" memory option) so that the executable can enable or disable dynamic memory allocation related target syntax errors. Each target may call the provided VI and tell the VI the user selected option. In one embodiment, the VI may maintain state and may switch on target syntax checking if it is supposed to, in which case, the target's plug-in may not need to be aware of these details.

Figure 11C:
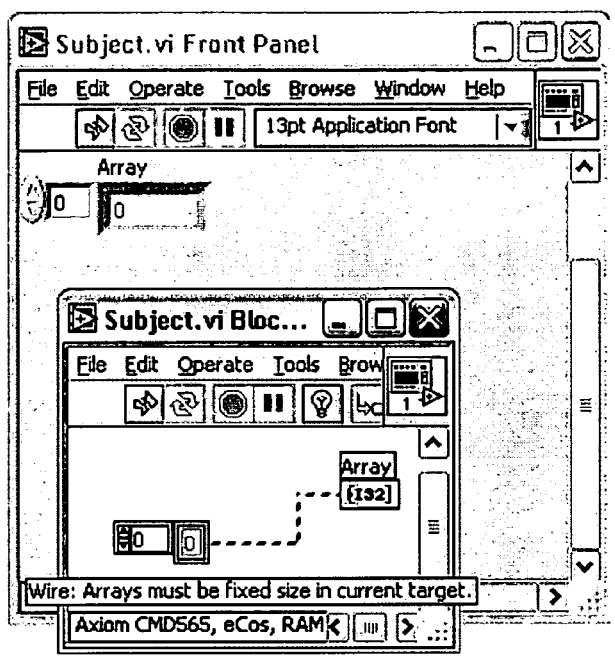

FIG. 11C illustrates one embodiment of a block diagram or VI (application) overlaid on a corresponding front panel. Note that this VI is in an embedded project for which static memory allocation has been selected. In this example, the application includes a variable-size array constant and a broken run arrow, indicating that static memory allocation is not possible with this particular configuration of the diagram.

Figure 11D:
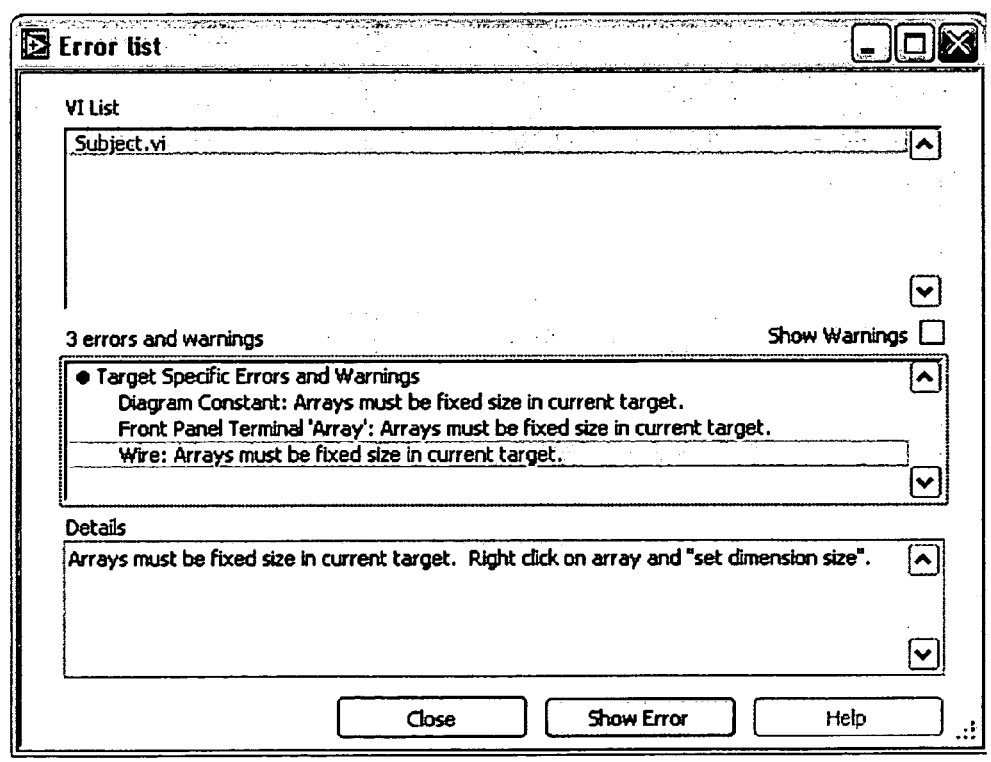

Further details of the error may be presented in an errors dialog or equivalent, as shown in FIG. 11D. As FIG. 11D shows, in some embodiments, a dialog may be provided displaying an error list for the VI. In this example, an "Arrays must be fixed size in current target" error may be displayed if the user uses variable-size arrays or strings anywhere, e.g., in an FPGA based system.

In various embodiments of the present invention, other features may be included. For example, an option allowing functions that require dynamic memory allocation may be provided, where bounded arrays may be used, and grown when necessary. In this approach, the user may set up bounded arrays and endeavor to not grow them larger than their maximum size during the lifetime of the program. If they do grow beyond this maximum size during the lifetime of the program (i.e., during execution), run-time errors may be generated, allowing the user to edit the program, e.g., either by increasing the size of the bounded arrays, or by modifying the program structure itself. This approach may maintain the more traditional user experience as compared to the approaches described above, but may result in many run-time errors during development, and more run-time overhead to resize the arrays.

In summary, in various embodiments of the invention, at edit-time, target syntax checking may optionally be performed on a graphical program to ensure that no dynamic memory allocation is required. A memory pre-allocation process may then ensure that fixed-size and bounded arrays and strings correctly infer which signals can be fixed-size or bounded and how much memory is required for them in all cases. In some embodiments, a code generator, e.g., a "G" or C generator may ensure that if every signal is linked to a fixed-size or bounded array, no dynamic memory allocation occurs anywhere. Finally, a compiler or other process may use information generated at edit-time about the fixed-size or bounded nature of array and string signals to generate a minimal set of fixed-size and bounded array and string globals, e.g., may generate static memory allocations and heap pointers, and then link all signals on the diagram to these statically allocated memory spaces. When the graphical program is executed, e.g., just prior to executing the first application program instruction, all memory required by the program may be statically allocated, and so no dynamic memory allocation is needed or performed.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium comprising program instructions implementing a graphical program development environment, wherein the program instructions are executable by a processor to perform:
   creating a graphical program in response to user input, wherein the graphical program comprises a plurality of interconnected nodes which visually indicate functionality of the graphical program, and wherein the graphical program comprises a plurality of data elements;
   analyzing the graphical program, comprising:
      determining memory requirements for each of the plurality of data elements; and
      determining one or more subsets of the plurality of data elements that can share a memory block; and
   including one or more static memory allocations in the graphical program in response to said analysis, wherein the one or more static memory allocations are executable to statically allocate shared memory blocks for each of the one or more subsets of data elements.

2. The memory medium of claim 1, wherein the plurality of interconnected nodes are interconnected by wires operable to communicate data between the nodes, and wherein said determining one or more subsets of the plurality of data elements that can share a memory block comprises:
   traversing the graphical program to determine one or more static paths, wherein each static path comprises a path of wire along which a single statically allocated block of memory can be used.

3. The memory medium of claim 1, wherein said analyzing the graphical program further comprises:
   prior to said determining memory requirements, determining if any of the data elements require dynamic memory allocation; and
   if said analyzing determines that dynamic memory is required, indicating an error.

4. The memory medium of claim 1,
   wherein the graphical program comprises one or more graphical sub-programs, each comprising a respective plurality of interconnected nodes which visually indicate functionality of the graphical sub-program, and wherein each graphical sub-program comprises a respective plurality of data elements; and
   wherein said analyzing the graphical program comprises analyzing the one or more graphical sub-programs; and
   wherein at least one of the one or more subsets of the plurality of data elements comprises data elements from:
      the graphical program and at least one of the one or more graphical sub-programs; or
      wherein the one or more graphical sub-programs comprise a plurality of graphical sub-programs, at least two of the plurality of graphical sub-programs.

5. The memory medium of claim 1, wherein the program instructions are further executable to perform:
   executing the graphical program, wherein said executing comprises:
      executing the one or more static memory allocations in the graphical program to statically allocate the shared memory blocks for each of the one or more subsets of data elements.

6. The memory medium of claim 1, wherein the program instructions are further executable to perform:

generating executable code based on the graphical program; and executing the executable code, wherein said executing comprises:

executing the one or more static memory allocations in the graphical program to statically allocate the shared memory blocks for each of the one or more subsets of data elements.

7. The memory medium of claim 6, wherein said generating executable code based on the graphical program comprises:

generating text-based source code based on the graphical program; and compiling the text-based source code to generate the executable code.

8. The memory medium of claim 1, wherein said including one or more static memory allocations in the graphical program comprises:

generating program instructions that are executable to generate the one or more static memory allocations; and executing the program instructions to generate the one or more static memory allocations.

9. The memory medium of claim 1, wherein the program instructions are further executable to perform:

displaying a graphical user interface (GUI), wherein the GUI is operable to receive user input specifying said analyzing the graphical program, and said including one or more static memory allocations in the graphical program; and receiving the user input specifying said analyzing the graphical program, and said including one or more static memory allocations in the graphical program, wherein said analyzing the graphical program, and said including one or more static memory allocations in the graphical program are performed in accordance with said user input.

10. The memory medium of claim 9, wherein the user input specifies one or more of:

build options;
debug options;
memory options; and
run-time options.

11. The memory medium of claim 9, wherein the GUI is comprised in a project manager, wherein the GUI is further operable to receive user input specifying one or more of:

an execution target for the graphical program;
invocation of one or more of:
a build process for the graphical program;
a run process for the graphical program; and
a debug process for the graphical program.

12. The memory medium of claim 11, wherein the execution target for the graphical program comprises one or more of:

an embedded device;
a programmable hardware element; and
a computer.

13. The memory medium of claim 1, wherein said creating the graphical program comprises:

arranging a plurality of nodes on a display; and
interconnecting the plurality of nodes in response to user input.

14. The memory medium of claim 1,
wherein the graphical program comprises a block diagram portion and a user interface portion.

15. The memory medium of claim 1,
wherein the graphical program comprises a graphical data flow program.

16. The memory medium of claim 1,
wherein the graphical program is operable to perform one or more of:
an industrial automation function;
a process control function;
a test and measurement function.

17. The memory medium of claim 16,
wherein, during execution of the graphical program, the graphical user interface is displayed on a display of a first computer system and the block diagram executes on a second computer system.

18. A method for allocating static memory for a graphical program, comprising:

creating a graphical program in response to user input, wherein the graphical program comprises a plurality of interconnected nodes which visually indicate functionality of the graphical program, and wherein the graphical program comprises a plurality of data elements;

programmatically analyzing the graphical program, comprising:

determining memory requirements for each of the plurality of data elements; and determining one or more subsets of the plurality of data elements that can share a memory block; and programmatically including one or more static memory allocations in the graphical program in response to said analysis, wherein the one or more static memory allocations are executable to statically allocate shared memory blocks for each of the one or more subsets of data elements.

19. A system for allocating static memory for a graphical program, the system comprising:

a processor; and a memory medium, coupled to the processor, wherein the memory medium stores program instructions implementing a graphical program development environment, wherein the program instructions are executable by the processor to:

create a graphical program in response to user input, wherein the graphical program comprises a plurality of interconnected nodes which visually indicate functionality of the graphical program, and wherein the graphical program comprises a plurality of data elements;

analyze the graphical program, wherein, in analyzing the graphical program, the program instructions are executable to:

determine memory requirements for each of the plurality of data elements; and determine one or more subsets of the plurality of data elements that can share a memory block; and include one or more static memory allocations in the graphical program in response to said analysis, wherein the one or more static memory allocations are executable to statically allocate shared memory blocks for each of the one or more subsets of data elements.

20. A system for allocating static memory for a graphical program, comprising:
- means for creating a graphical program in response to user input, wherein the graphical program comprises a plurality of interconnected nodes which visually indicate functionality of the graphical program, and wherein the graphical program comprises a plurality of data elements;
- means for programmatically analyzing the graphical program, comprising:
  - means for determining memory requirements for each of the plurality of data elements; and
  - means for determining one or more subsets of the plurality of data elements that can share a memory block; and
- means for programmatically including one or more static memory allocations in the graphical program in response to said analysis, wherein the one or more static memory allocations are executable to statically allocate shared memory blocks for each of the one or more subsets of data elements.

\* \* \* \* \*